United States Patent
Onozawa

(10) Patent No.: US 10,829,005 B2
(45) Date of Patent: Nov. 10, 2020

(54) VEHICULAR HEAT EXCHANGE DEVICE

(71) Applicant: AISIN SEIKI KABUSHIKI KAISHA, Kariya (JP)

(72) Inventor: Satoru Onozawa, Anjo (JP)

(73) Assignee: AISIN SEIKI KABUSHIKI KAISHA, Kariya (JP)

(*) Notice: Subject to any disclaimer, the term of this patent is extended or adjusted under 35 U.S.C. 154(b) by 119 days.

(21) Appl. No.: 16/192,870

(22) Filed: Nov. 16, 2018

(65) Prior Publication Data
US 2019/0152343 A1    May 23, 2019

(30) Foreign Application Priority Data
Nov. 17, 2017  (JP) ................................ 2017-221646

(51) Int. Cl.
*B60L 58/26* (2019.01)
*F28F 27/02* (2006.01)
(Continued)

(52) U.S. Cl.
CPC .............. *B60L 58/26* (2019.02); *B60K 6/22* (2013.01); *B60K 11/02* (2013.01); *B60L 3/00* (2013.01);
(Continued)

(58) Field of Classification Search
CPC .......... B60L 58/26; B60L 3/00; B60L 3/0046; F25B 29/00; B60H 1/00385; B60H 1/004;
(Continued)

(56) References Cited

U.S. PATENT DOCUMENTS 3,948,226 A * 4/1976 Green ...................... F01C 9/00
123/18 R
4,224,906 A * 9/1980 Happel ................... F02D 21/08
123/568.14
(Continued)

FOREIGN PATENT DOCUMENTS

DE       102011003430 B3 *  5/2012  .............. F01P 11/14
DE     10 2011 118 898 A1    6/2012
(Continued)

OTHER PUBLICATIONS

The extended European Search Report dated Mar. 19, 2019, by the European Patent Office in corresponding European Patent Application No. 18206794.2-1004. (8 pages).

*Primary Examiner* — Len Tran
*Assistant Examiner* — Jenna M Hopkins
(74) *Attorney, Agent, or Firm* — Buchanan Ingersoll & Rooney PC

(57) ABSTRACT

A vehicular heat exchange device includes: a first medium flow circuit through which a heat exchange medium that exchanges heat with an internal combustion engine flows; a second medium flow circuit through which the heat exchange medium that exchanges heat with an electric power storage unit that can be charged and discharged flows; and a first valve portion switching between a communication state and a non-communication state between the first medium flow circuit and the second medium flow circuit, in which the vehicular heat exchange device is configured such that the first valve portion causes the first medium flow circuit and the second medium flow circuit to be in the communication state to raise a temperature of the internal combustion engine before driving of the internal combustion engine using heat of the electric power storage unit.

8 Claims, 11 Drawing Sheets

(51) Int. Cl.

| | |
|---|---|
| *B60K 6/22* | (2007.10) |
| *B60K 11/02* | (2006.01) |
| *F01P 7/14* | (2006.01) |
| *B60L 53/14* | (2019.01) |
| *F02N 19/10* | (2010.01) |
| *H01M 10/44* | (2006.01) |
| *F01P 7/16* | (2006.01) |
| *H01M 10/663* | (2014.01) |
| *H01M 10/6568* | (2014.01) |
| *H01M 10/625* | (2014.01) |
| *B60L 3/00* | (2019.01) |
| *B60H 1/00* | (2006.01) |
| *F25B 29/00* | (2006.01) |

(52) U.S. Cl.
CPC .......... B60L 3/0023 (2013.01); B60L 3/0046 (2013.01); B60L 53/14 (2019.02); F01P 7/14 (2013.01); F01P 7/165 (2013.01); F02N 19/10 (2013.01); F28F 27/02 (2013.01); H01M 10/443 (2013.01); H01M 10/625 (2015.04); H01M 10/6568 (2015.04); H01M 10/663 (2015.04); *B60H 1/004* (2013.01); *B60H 1/00385* (2013.01); *B60L 2240/445* (2013.01); *B60Y 2200/92* (2013.01); *B60Y 2300/91* (2013.01); *F01P 2007/146* (2013.01); *F01P 2050/24* (2013.01); *F25B 29/00* (2013.01)

(58) Field of Classification Search
CPC .......... H01M 10/625; H01M 10/6568; H01M 10/663; F01P 2050/24
See application file for complete search history.

(56) References Cited

U.S. PATENT DOCUMENTS

| | | | | |
|---|---|---|---|---|
| 4,319,547 | A * | 3/1982 | Bierling | F01P 7/165 123/41.08 |
| 4,913,107 | A * | 4/1990 | Schweiger | F01P 11/0247 123/41.1 |
| 5,415,147 | A * | 5/1995 | Nagle | F01P 3/20 123/41.29 |
| 5,617,815 | A * | 4/1997 | Spies | F16K 11/076 123/41.1 |
| 6,047,895 | A * | 4/2000 | Pastleitner | F01P 3/02 236/34.5 |
| 6,196,167 | B1 * | 3/2001 | Marsh | F01P 7/14 123/41.09 |
| 6,688,333 | B2 * | 2/2004 | McLane | B60H 1/00485 123/41.1 |
| 6,994,316 | B2 * | 2/2006 | Pervaiz | F16K 5/0478 251/160 |
| 7,189,942 | B2 | 3/2007 | Kotani et al. | |
| 7,424,869 | B2 * | 9/2008 | Haase | F01P 7/16 123/41.1 |
| 7,610,954 | B2 * | 11/2009 | Ando | F01P 7/048 165/202 |
| 7,984,700 | B2 * | 7/2011 | Chanfreau | B60H 1/00485 123/41.08 |
| 8,181,610 | B2 * | 5/2012 | Dipaola | F01P 7/165 123/41.01 |
| 8,347,831 | B2 * | 1/2013 | Vacca | F16K 11/085 123/41.08 |
| 8,555,825 | B2 * | 10/2013 | Lenz | F01P 3/02 123/41.79 |
| 8,763,418 | B2 * | 7/2014 | Kim | H01M 8/04074 62/305 |
| 8,800,503 | B2 * | 8/2014 | Bohm | F01P 7/165 123/41.31 |
| 8,851,026 | B2 * | 10/2014 | Brinkmann | F01P 11/0285 123/41.02 |
| 8,909,398 | B2 * | 12/2014 | Sawada | B60K 11/02 165/200 |
| 9,649,909 | B2 * | 5/2017 | Enomoto | B60L 50/15 |
| 9,823,009 | B2 * | 11/2017 | Ragazzi | B60H 1/321 |
| 9,919,710 | B2 | 3/2018 | Murata | |
| 10,211,493 | B2 * | 2/2019 | Janarthanam | B60L 1/003 |
| 10,290,911 | B2 * | 5/2019 | Zhou | H01M 10/6569 |
| 10,364,737 | B2 * | 7/2019 | Roehm | F01P 11/029 |
| 2003/0079728 | A1 * | 5/2003 | Marsh | F01P 3/20 123/563 |
| 2003/0098077 | A1 * | 5/2003 | McLane | F16K 11/0856 137/625.47 |
| 2004/0216700 | A1 * | 11/2004 | Hutchins | B60H 1/00314 123/41.08 |
| 2005/0006487 | A1 * | 1/2005 | Suda | G05D 23/1951 236/46 R |
| 2007/0175442 | A1 * | 8/2007 | Vichinsky | F02D 11/06 123/336 |
| 2008/0035080 | A1 * | 2/2008 | Haase | F01P 7/16 123/41.1 |
| 2008/0236193 | A1 * | 10/2008 | Chen | F25B 5/00 62/511 |
| 2009/0211247 | A1 * | 8/2009 | McEwan | F02D 9/06 60/602 |
| 2009/0308335 | A1 * | 12/2009 | Dipaola | F01P 7/16 123/41.1 |
| 2010/0100266 | A1 * | 4/2010 | Yoshinori | B60L 58/27 701/22 |
| 2012/0180980 | A1 * | 7/2012 | Malvicino | B60L 58/27 165/42 |
| 2012/0225341 | A1 * | 9/2012 | Major | B60H 1/143 429/120 |
| 2012/0227580 | A1 * | 9/2012 | Dudar | G01M 3/04 95/19 |
| 2012/0234266 | A1 * | 9/2012 | Faulkner | F01P 7/165 123/41.1 |
| 2012/0247715 | A1 * | 10/2012 | Renner | B60H 1/00385 165/42 |
| 2012/0247716 | A1 * | 10/2012 | Galtz | B60L 3/003 165/42 |
| 2013/0111932 | A1 * | 5/2013 | Mishima | B60L 58/27 62/79 |
| 2013/0140001 | A1 * | 6/2013 | Mandl | H01M 10/625 165/96 |
| 2013/0167786 | A1 * | 7/2013 | Mehring | F01P 3/02 123/41.82 R |
| 2013/0186351 | A1 * | 7/2013 | Quix | F01P 3/02 123/41.02 |
| 2014/0144134 | A1 * | 5/2014 | McEwan | F02B 33/40 60/602 |
| 2014/0225426 | A1 * | 8/2014 | Dabbs | B60T 13/141 303/10 |
| 2015/0047340 | A1 * | 2/2015 | Ulrey | F02D 41/0047 60/600 |
| 2015/0101693 | A1 * | 4/2015 | Enomoto | F16K 27/003 137/597 |
| 2015/0217622 | A1 * | 8/2015 | Enomoto | B60L 1/003 165/42 |
| 2015/0217623 | A1 * | 8/2015 | Hatakeyama | B60L 58/26 165/42 |
| 2015/0283914 | A1 * | 10/2015 | Malone | B60L 58/26 701/49 |
| 2016/0107505 | A1 * | 4/2016 | Johnston | B60H 1/00914 165/202 |
| 2016/0109890 | A1 * | 4/2016 | Styron | G05D 23/022 236/34.5 |
| 2016/0153573 | A1 * | 6/2016 | Atschreiter | F16K 17/386 137/467 |
| 2016/0215680 | A1 * | 7/2016 | Quix | F01P 3/02 |
| 2016/0229411 | A1 * | 8/2016 | Murata | B60L 50/61 |
| 2016/0248129 | A1 * | 8/2016 | Dunham | H01M 10/663 |
| 2016/0251998 | A1 * | 9/2016 | Ekman | F01P 3/12 165/51 |
| 2016/0325601 | A1 * | 11/2016 | Richter | F01P 7/167 |
| 2017/0008407 | A1 * | 1/2017 | Porras | B60H 1/00921 |
| 2017/0159548 | A1 * | 6/2017 | Richter | F02D 31/001 |

(56) References Cited

U.S. PATENT DOCUMENTS

| | | | |
|---|---|---|---|
| 2017/0365901 A1* | 12/2017 | Hiramitsu | H01M 10/613 |
| 2018/0029444 A1* | 2/2018 | Porras | B60H 1/034 |
| 2018/0117984 A1* | 5/2018 | Kim | B60H 1/00392 |
| 2018/0119827 A1* | 5/2018 | Ozeki | F16K 31/041 |
| 2018/0170144 A1* | 6/2018 | Yang | B60H 1/00571 |
| 2018/0178615 A1* | 6/2018 | Xia | B60H 1/00392 |
| 2018/0281557 A1* | 10/2018 | Park | B60H 1/2221 |
| 2018/0345815 A1* | 12/2018 | Porras | B60L 58/27 |
| 2019/0047352 A1* | 2/2019 | Kim | B60H 1/00278 |
| 2019/0047369 A1* | 2/2019 | Kim | F25B 25/005 |
| 2019/0234290 A1* | 8/2019 | Justel | F01P 3/02 |
| 2019/0308490 A1* | 10/2019 | Obuchi | B60K 6/48 |
| 2020/0189357 A1* | 6/2020 | Chopard | B60H 1/00492 |

FOREIGN PATENT DOCUMENTS

| | | | | |
|---|---|---|---|---|
| DE | 102012210320 B3 * | 9/2013 | | F01P 7/14 |
| EP | 0972916 A2 * | 1/2000 | | B60T 1/087 |
| EP | 2409864 A1 * | 1/2012 | | B60L 58/26 |
| JP | 2005295668 A | 10/2005 | | |
| JP | 2011015544 A | 1/2011 | | |
| JP | 2013095409 A | 5/2013 | | |
| JP | 2015063159 A | 4/2015 | | |
| WO | WO-2006094636 A1 * | 9/2006 | | F01P 7/16 |
| WO | WO-2009143866 A1 * | 12/2009 | | F01P 3/02 |
| WO | WO-2013124173 A1 * | 8/2013 | | B60H 1/00271 |

\* cited by examiner

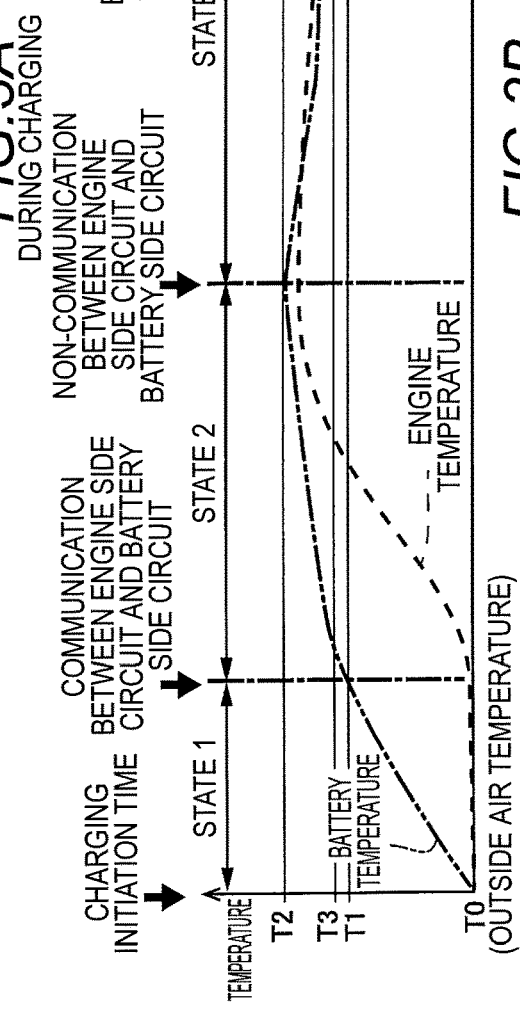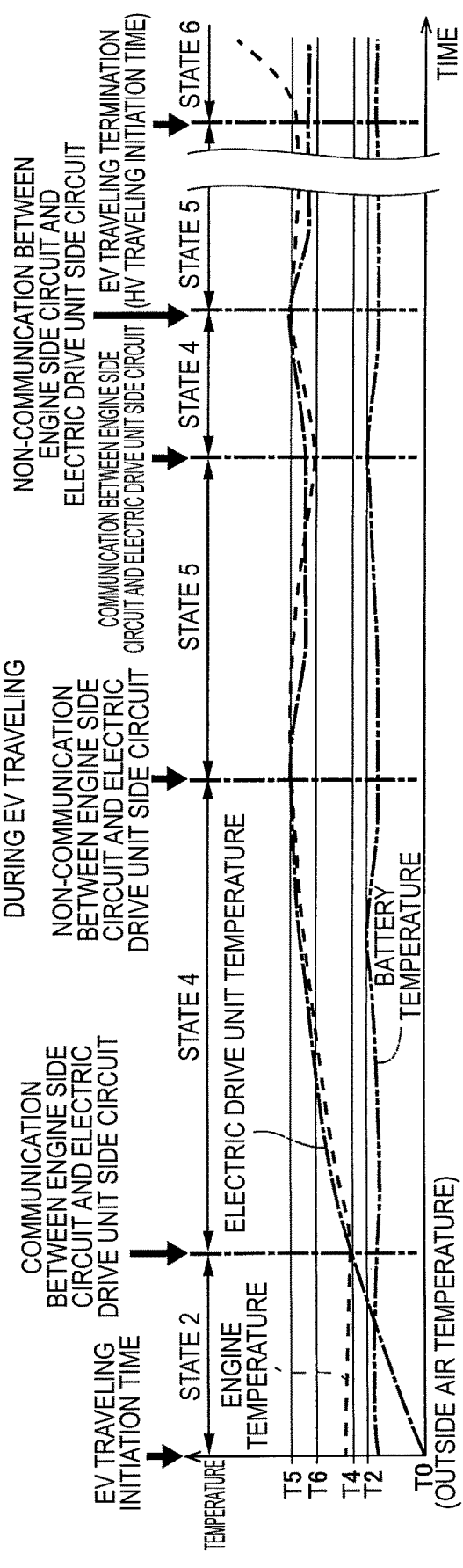

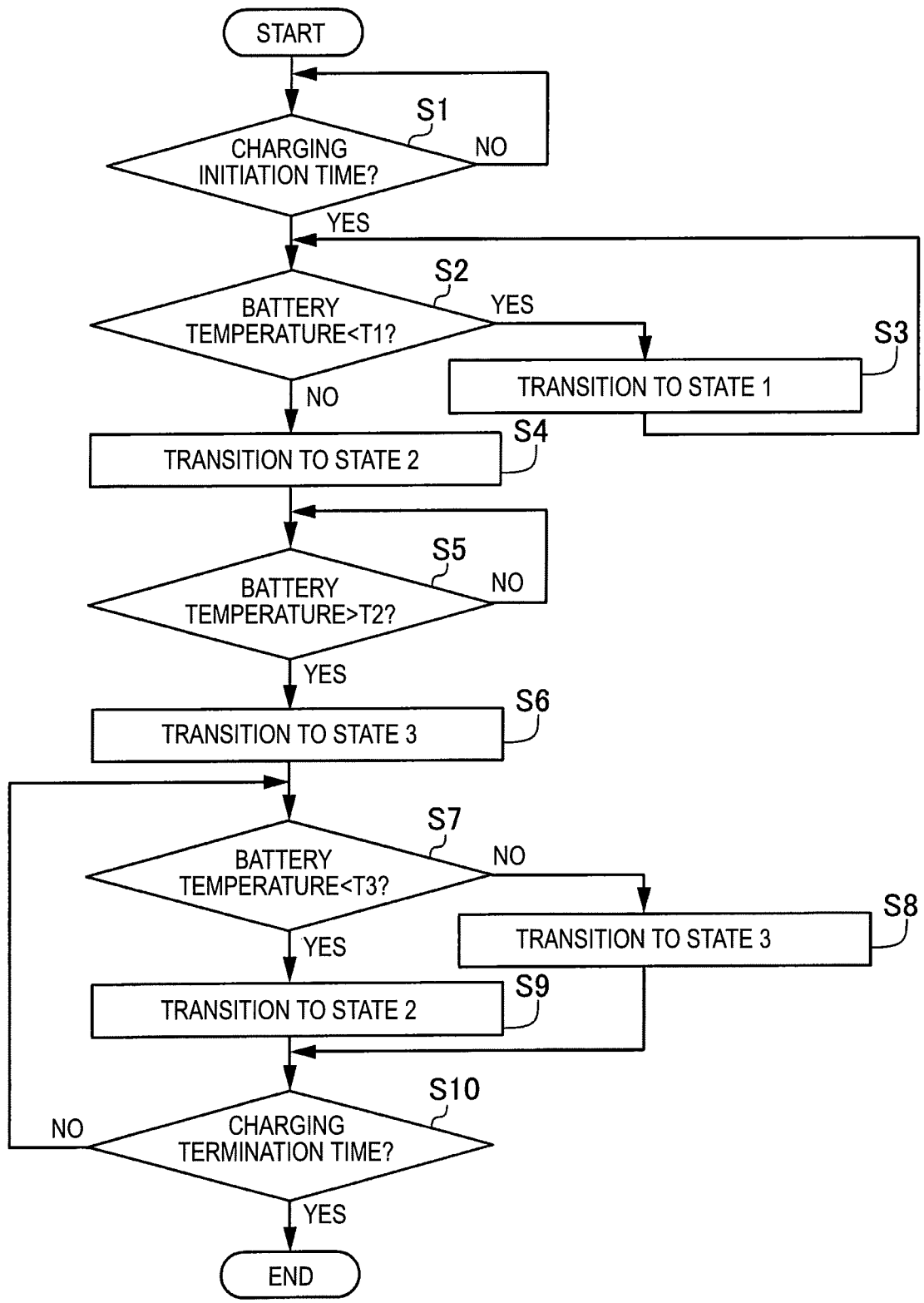

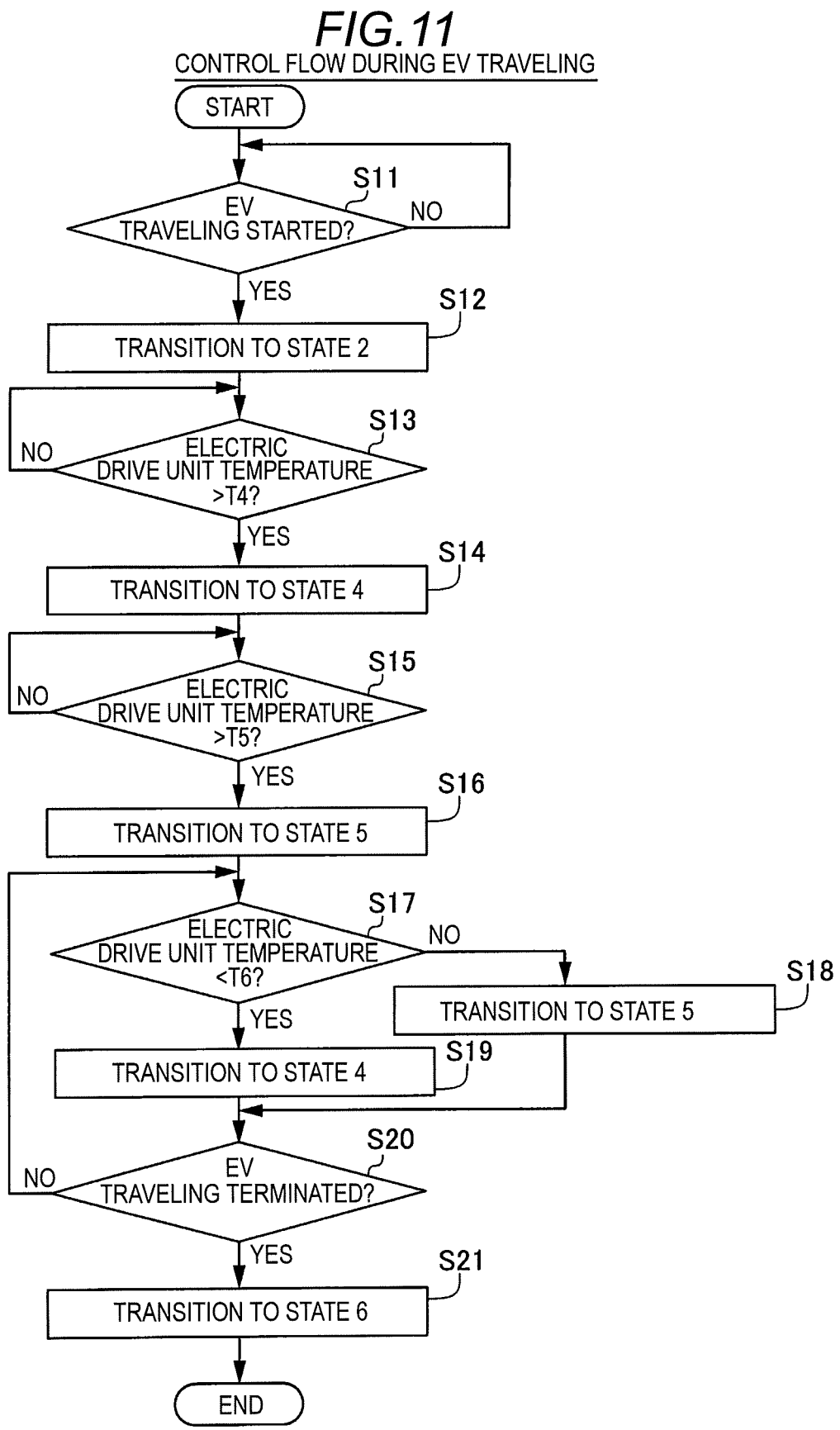

VEHICULAR HEAT EXCHANGE DEVICE

CROSS REFERENCE TO RELATED APPLICATIONS

This application is based on and claims priority under 35 U.S.C. § 119 to Japanese Patent Application 2017-221646, filed on Nov. 17, 2017, the entire contents of which are incorporated herein by reference.

TECHNICAL FIELD

This disclosure relates to a vehicular heat exchange device.

BACKGROUND DISCUSSION

Known in the related art is a vehicular heat exchange device used in a vehicle provided with an internal combustion engine and an electric power storage unit that can be charged and discharged (see, for example, JP 2011-15544A (Reference 1)).

Disclosed in Reference 1 is an electric vehicle provided with a capacitor (electric power storage unit) that can be charged and discharged, an electric motor driven by discharging from the capacitor, an internal combustion engine provided for electric power generation, and a heater and a fan driven by electric power supply from the capacitor. In this electric vehicle, the heater and the fan are driven by means of the electric power from the capacitor before capacitor charging initiation, and then the temperature of the capacitor is raised by the hot air from the heater and the fan and heat generation resulting from discharging of the capacitor. Subsequently, capacitor charging is initiated with the temperature raised, and then the capacitor charging efficiency is improved.

In the electric vehicle disclosed in Reference 1, self-heat generation occurs in the capacitor during the charging. In a state where the capacitor charging efficiency is sufficiently high at that time, the heat that is generated in the capacitor is unnecessary. Accordingly, it is considered that there is a problem in that the heat generated in the capacitor is not effectively utilized.

Thus, a need exists for a vehicular heat exchange device which is not susceptible to the drawback mentioned above.

SUMMARY

A vehicular heat exchange device according to one aspect of this disclosure includes a first medium flow circuit through which a heat exchange medium that exchanges heat with an internal combustion engine flows; a second medium flow circuit through which the heat exchange medium that exchanges heat with an electric power storage unit that can be charged and discharged flows; and a first valve portion switching between a communication state and a non-communication state between the first medium flow circuit and the second medium flow circuit, in which the vehicular heat exchange device is configured such that the first valve portion causes the first medium flow circuit and the second medium flow circuit to be in the communication state to raise a temperature of the internal combustion engine before driving of the internal combustion engine using heat of the electric power storage unit.

BRIEF DESCRIPTION OF THE DRAWINGS

The foregoing and additional features and characteristics of this disclosure will become more apparent from the following detailed description considered with the reference to the accompanying drawings, wherein:

FIG. 3A is a graph illustrating an example of a temperature change during charging of the heat exchange device according to the embodiment disclosed here, and FIG. 3B is a graph illustrating an example of a temperature change during EV traveling of the heat exchange device according to the embodiment disclosed here;

FIG. 10 is a control flow during charging according to the embodiment disclosed here; and FIG. 11 is a control flow during EV traveling according to the embodiment disclosed here.

DETAILED DESCRIPTION

Hereinafter, an embodiment disclosed here will be described with reference to accompanying drawings.

A vehicle 100 provided with a vehicular heat exchange device 6 (hereinafter, referred to as a heat exchange device 6) according to the embodiment disclosed here will be described below with reference to FIGS. 1 to 9.

Configuration of Vehicle

Figure 1:
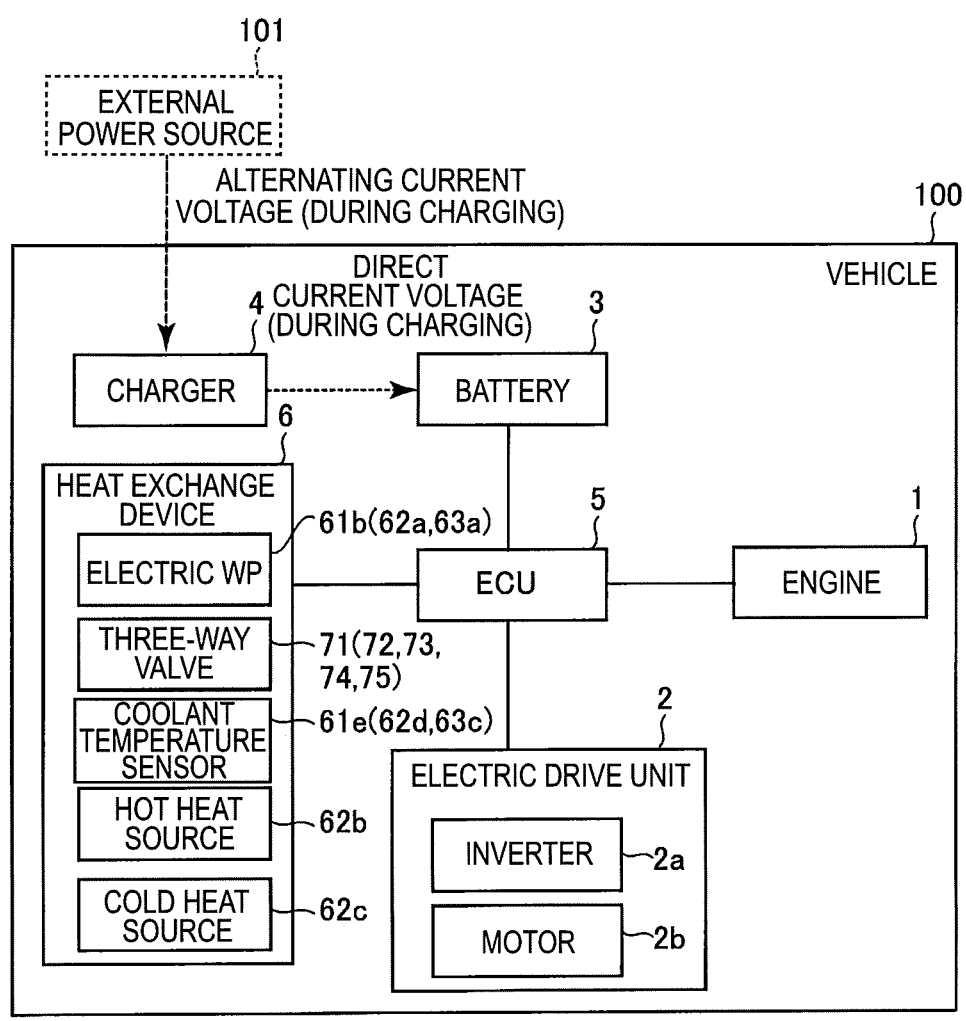
FIG. 1 is a block diagram of a vehicle provided with a heat exchange device according to an embodiment disclosed here.

As illustrated in FIG. 1, the vehicle 100 of the present embodiment is provided with an engine 1 (an example of an internal combustion engine), an electric drive unit 2, a battery 3 (an example of an electric power storage unit), a charger 4, and an engine control unit (ECU) 5.

The engine 1 is an apparatus that converts thermal energy resulting from fuel combustion into mechanical kinetic energy. The electric drive unit 2 is a device that converts electric energy into mechanical kinetic energy. The battery 3 is a device that can be electrically charged and discharged. A plurality of lithium ion secondary batteries or the like constitutes the battery 3. The charger 4 includes a plug (not illustrated) connected to an external power source 101. The charger 4 converts an alternating current from the external power source 101 into a direct current and controls charging of the battery 3 with a direct current. The ECU 5 includes a CPU, a memory, and so on. The ECU 5 controls the vehicle 100 as a whole and controls the heat exchange device 6, which will be described later.

The vehicle 100 is capable of driving such as traveling using one or both of the engine 1 and the electric drive unit 2 and is configured such that the battery 3 can be charged from the external power source 101 via the charger 4. In other words, the vehicle 100 is a so-called plug-in hybrid vehicle (PHV). Note that a case where the vehicle 100 is driven to travel solely by means of the electric drive unit 2 will be referred to as electric vehicle (EV) traveling and a case where the vehicle 100 is caused to travel such that the engine 1 and the electric drive unit 2 are appropriately switched in traveling states will be referred to as hybrid vehicle (HV) traveling.

The electric drive unit 2 includes an inverter 2a and a motor 2b (an example of a drive motor). The inverter 2a converts a direct current from the battery 3 into an alternating current based on an instruction from the ECU 5 and controls the rotation speed of the motor 2b by performing frequency adjustment or the like. The motor 2b is, for example, a synchronous motor. The motor 2b is driven to rotate based on an alternating current input from the inverter 2a.

Both the engine 1 and the motor 2b are configured to perform driving such as traveling of the vehicle 100 by rotationally driving a crankshaft (not illustrated).

Here, the preferable temperature range of the battery 3 in which the efficiency of charging and discharging or the like is improved is lower than the preferable temperature range of the electric drive unit 2 in which drive efficiency or the like is improved. The optimum temperature range of the engine 1 in which combustion efficiency or the like is improved is higher than the preferable temperature range of the electric drive unit 2.

Configuration of Heat Exchange Device

Figure 2:
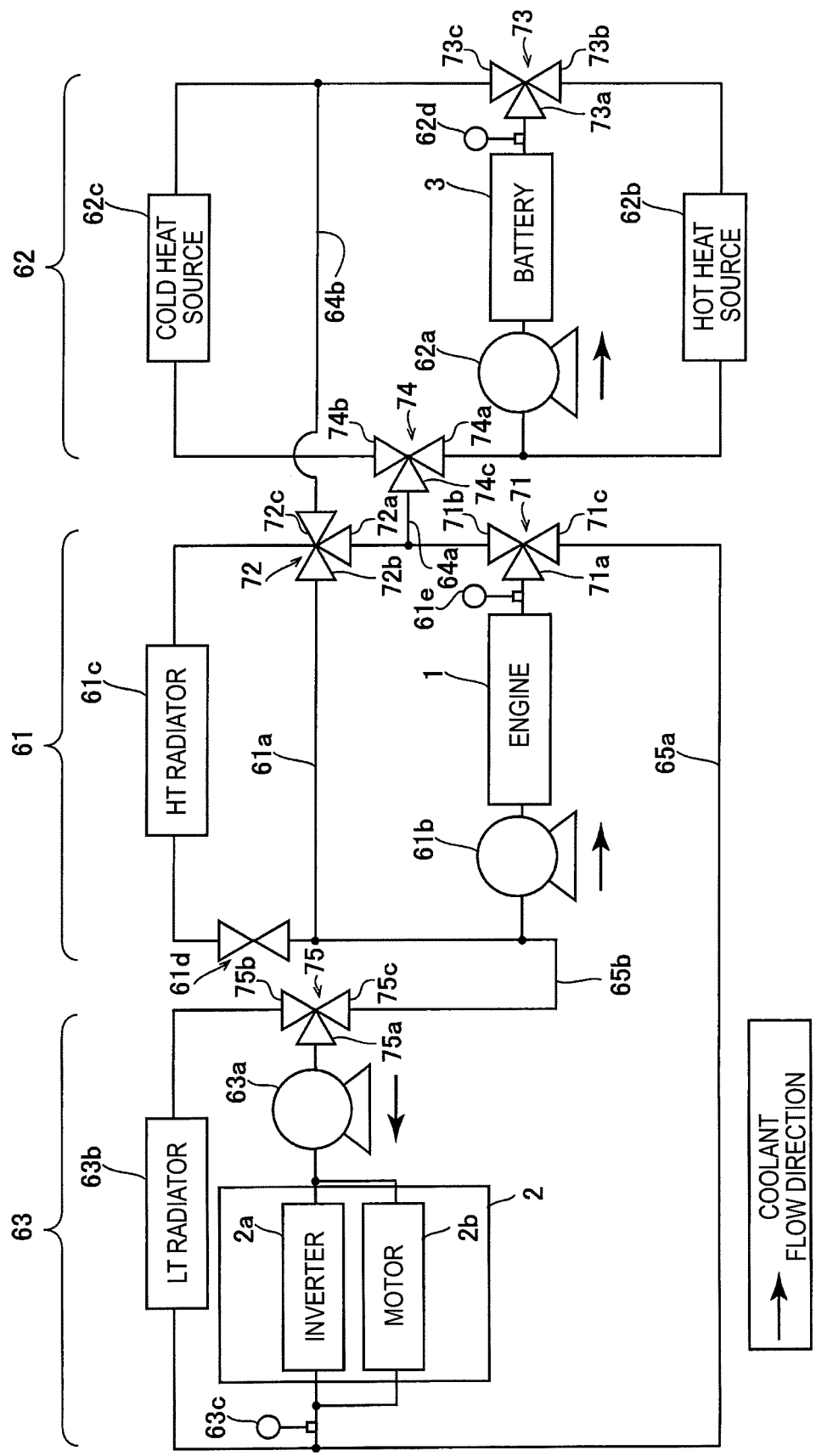
FIG. 2 is a diagram illustrating a coolant circuit of the heat exchange device according to the embodiment disclosed here.

The vehicle 100 according to the present embodiment further includes the heat exchange device 6 for raising the temperatures of or cooling the engine 1, the electric drive unit 2, and the battery 3. As illustrated in FIG. 2, the heat exchange device 6 includes an engine side circuit 61 (an example of a first medium flow circuit), a battery side circuit 62 (an example of a second medium flow circuit), and an electric drive unit side circuit 63 (an example of a third medium flow circuit). Each of the engine side circuit 61, the battery side circuit 62, and the electric drive unit side circuit 63 is a coolant circuit through which a coolant (an example of a heat exchange medium) flows. The heat exchange device 6 further includes a pair of first connection circuits 64a and 64b for coolant flow between the engine side circuit 61 and the battery side circuit 62 and a pair of second connection circuits 65a and 65b for coolant flow between the engine side circuit 61 and the electric drive unit side circuit 63.

The engine side circuit 61 includes a branch circuit 61a. The coolant flow path of the engine side circuit 61 is formed by an electric water pump 61b, a high temperature (HT) radiator 61c, two three-way valves 71 and 72, a thermostat valve 61d, and a coolant temperature sensor 61e being connected by a pipe member through which a coolant flows. The engine 1 is disposed on the coolant flow path of the engine side circuit 61. Specifically, a water jacket (not illustrated) formed integrally with the engine 1 is disposed in the middle of the coolant flow path of the engine side circuit 61, and the engine 1 is raised in temperature or cooled as a result of coolant flow inside the water jacket. Note that the coolant discharge side of the electric water pump 61b is the upstream side and the coolant suction side of the electric water pump 61b is the downstream side.

The electric water pump 61b controls the flow velocity of the coolant of the engine side circuit 61 based on an instruction from the ECU 5. The electric water pump 61b is disposed on the upstream side of the engine 1 so as to discharge the coolant to the water jacket of the engine 1. Note that the electric water pump 61b is capable of increasing the flow velocity of the coolant although the electric water pump 61b consumes more electric power for driving than an electric water pump 62a of the battery side circuit 62 and an electric water pump 63a of the electric drive unit side circuit 63, which will be described later. Accordingly, the amount of heat of the engine 1 that is transferred to the coolant can be increased, and thus the engine 1 can be reliably cooled when the engine 1 needs to be quickly cooled.

The high temperature radiator 61c is disposed on the downstream side of the engine 1. In the high temperature radiator 61c, the coolant of the engine side circuit 61 is cooled as a result of heat exchange between the coolant of the engine side circuit 61 and outside air.

The three-way valves 71 and 72 control the flow direction of the coolant based on an instruction from the ECU 5. The three-way valve 71 is disposed at the merging point of the downstream side of the engine 1, the upstream side of the high temperature radiator 61c, and the engine side circuit 61 side of the second connection circuit 65a. The three-way valve 71 is configured to be capable of opening and closing an outlet 71a on the engine 1 side, an outlet 71b on the high temperature radiator 61c side, and an outlet 71c on the second connection circuit 65a side.

The three-way valve 72 is disposed at the merging point of the downstream side of the three-way valve 71, the branch circuit 61a, and the engine side circuit 61 side of the first connection circuit 64b. The three-way valve 72 is configured to be capable of opening and closing an outlet 72a on the three-way valve 71 side, an outlet 72b on the branch circuit 61a side, and an outlet 72c on the first connection circuit 64b side. In addition, the three-way valve 72 is connected to the upstream side of the high temperature radiator 61c and is configured such that a part of the coolant can be supplied to the high temperature radiator 61c side after the coolant reaches the three-way valve 72.

The thermostat valve 61d is disposed on the downstream side of the high temperature radiator 61c and regulates the flow of the coolant at or below a temperature T7. Note that the temperature T7 is a temperature that can be reached by heat generation from the engine 1 when the engine 1 is driven.

The coolant temperature sensor 61e measures the temperature of the coolant between the downstream side of the engine 1 and the three-way valve 71 and transmits the result of the measurement to the ECU 5. Note that the coolant temperature that is measured by the coolant temperature sensor 61e can be used as the temperature of the engine 1 (engine temperature) by being a temperature raised by the engine 1.

The branch circuit 61a connects the outlet 72b of the three-way valve 72 and the downstream side of the thermostat valve 61d.

The coolant flow path of the battery side circuit 62 is formed by the electric water pump 62a, a hot heat source 62b, a cold heat source 62c (an example of an electric power storage unit cooling unit), two three-way valves 73 and 74, and a coolant temperature sensor 62d being connected by a pipe member through which a coolant flows. The battery 3 is disposed on the coolant flow path of the battery side circuit 62. Specifically, a water jacket (not illustrated) surrounding the battery 3 is disposed in the middle of the coolant flow path of the battery side circuit 62, and the battery 3 is raised in temperature or cooled as a result of coolant flow inside the water jacket. Note that the coolant discharge side of the electric water pump 62a is the upstream side and the coolant suction side of the electric water pump 62a is the downstream side.

The electric water pump 62a controls the flow velocity of the coolant of the battery side circuit 62 based on an instruction from the ECU 5. In addition, the electric water pump 62a is disposed on the upstream side of the battery 3 so as to discharge the coolant to the water jacket of the battery 3.

The hot heat source 62b and the cold heat source 62c are disposed in parallel on the downstream side of the battery 3. The hot heat source 62b is constituted by, for example, a heater driven by discharging from the battery 3. In the hot heat source 62b, the coolant of the battery side circuit 62 is raised in temperature by the coolant of the battery side circuit 62 and the heater that exchanges heat based on an instruction from the ECU 5. The cold heat source 62c is, for example, an evaporator of an in-vehicle heat pump device for air conditioning driven by discharging from the battery 3. In the cold heat source 62c, the coolant of the battery side circuit 62 is cooled by the coolant of the battery side circuit 62 and a low-temperature refrigerant in the evaporator exchanges heat based on an instruction from the ECU 5.

The three-way valves 73 and 74 control the flow direction of the coolant based on an instruction from the ECU 5. The three-way valve 73 is disposed at the merging point of the downstream side of the battery 3, the upstream side of the hot heat source 62b, and the upstream side of the cold heat source 62c. The three-way valve 73 is configured to be capable of opening and closing an outlet 73a on the battery 3 side, an outlet 73b on the hot heat source 62b side, and an outlet 73c on the cold heat source 62c side.

The three-way valve 74 is disposed at the merging point of the downstream side of the electric water pump 62a, the downstream side of the cold heat source 62c, and the battery side circuit 62 side of the first connection circuit 64a. The three-way valve 74 is configured to be capable of opening and closing an outlet 74a on the electric water pump 62a side, an outlet 74b on the cold heat source 62c side, and an outlet 74c on the first connection circuit 64a side. Note that the downstream side of the electric water pump 62a and the downstream side of the hot heat source 62b are connected.

The coolant temperature sensor 62d measures the temperature of the coolant between the downstream side of the battery 3 and the three-way valve 73 and transmits the result of the measurement to the ECU 5. Note that the coolant temperature that is measured by the coolant temperature sensor 62d can be used as the temperature of the battery 3 (battery temperature) by being a temperature raised by the battery 3.

The coolant flow path of the electric drive unit side circuit 63 is formed by the electric water pump 63a, a low temperature (LT) radiator 63b, a three-way valve 75, and a coolant temperature sensor 63c being connected by a pipe member through which a coolant flows. The electric drive unit 2 (inverter 2a and motor 2b) is disposed on the coolant flow path of the electric drive unit side circuit 63. Specifically, a cooling pipe (not illustrated) circulating on the lower surface of a substrate constituting the inverter 2a and a water jacket (not illustrated) surrounding the motor 2b are disposed in parallel in the middle of the coolant flow path of the electric drive unit side circuit 63, and the electric drive unit 2 is raised in temperature or cooled as a result of coolant flow inside the cooling pipe and the water jacket. Note that the coolant discharge side of the electric water pump 63a is the upstream side and the coolant suction side of the electric water pump 63a is the downstream side.

The electric water pump 63a controls the flow velocity of the coolant of the electric drive unit side circuit 63 based on an instruction from the ECU 5. The electric water pump 63a is disposed on the upstream side of the electric drive unit 2 so as to discharge the coolant to the electric drive unit 2. The low temperature radiator 63b is disposed on the downstream side of the electric drive unit 2. In the low temperature radiator 63b, the coolant of the electric drive unit side circuit 63 is cooled as a result of heat exchange between the coolant of the electric drive unit side circuit 63 and outside air.

The three-way valve 75 controls the flow direction of the coolant based on an instruction from the ECU 5. The three-way valve 75 is disposed at the merging point of the downstream side of the electric water pump 63a, the downstream side of the low temperature radiator 63b, and the electric drive unit side circuit 63 side of the second connection circuit 65b. The three-way valve 75 is configured to be capable of opening and closing an outlet 75a on the electric water pump 63a side, an outlet 75b on the low temperature radiator 63b side, and an outlet 75c on the second connection circuit 65b side.

The coolant temperature sensor 63c measures the temperature of the coolant on the downstream side of the electric drive unit 2 and transmits the result of the measurement to the ECU 5. Note that the coolant temperature that is measured by the coolant temperature sensor 63c can be used as the temperature of the electric drive unit 2 (electric drive unit temperature) by being a temperature raised by the electric drive unit 2.

The first connection circuit 64a is formed by a pipe member connecting the three-way valve 74 and the downstream side of the three-way valve 71 that is the upstream side of the three-way valve 72. The first connection circuit 64b is formed by a pipe member connecting the three-way valve 72 and the downstream side of the three-way valve 73 that is the upstream side of the cold heat source 62c. The second connection circuit 65a is formed by a pipe member connecting the three-way valve 71 and the downstream side of the electric drive unit 2. The second connection circuit 65b is formed by a pipe member connecting the three-way valve 75 and the downstream side of the electric water pump 61b.

Figure 5:
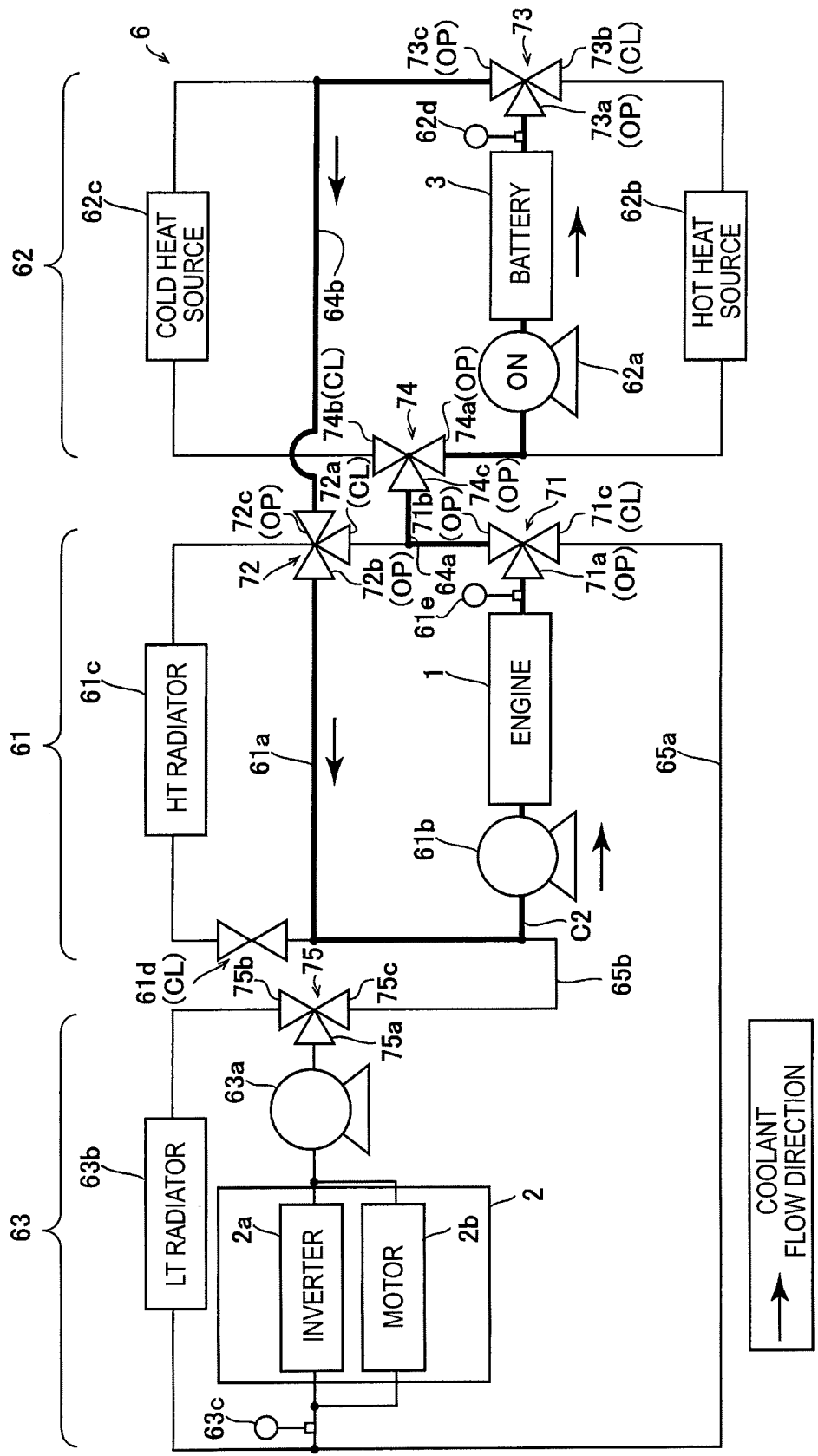
FIG. 5 is a circuit diagram illustrating State 2 of the heat exchange device according to the embodiment disclosed here.

As a result of the above configuration, in the heat exchange device 6 of the present embodiment, communication and non-communication states between the engine side circuit 61 and the battery side circuit 62 can be switched by the three-way valves 71, 72, 73, and 74 (an example of a first valve portion). For example, as illustrated in FIG. 5, the communication state between the engine side circuit 61 and the battery side circuit 62 can be achieved and the coolant can be circulated between the engine side circuit 61 and the battery side circuit 62 by the outlets 71a and 71b of the three-way valve 71, the outlets 72b and 72c of the three-way valve 72, the outlets 73a and 73c of the three-way valve 73, and the outlets 74a and 74c of the three-way valve 74 being put into an open state (OP) and the outlet 71c of the three-way valve 71, the outlet 72a of the three-way valve 72, the outlet 73b of the three-way valve 73, and the outlet 74b of the three-way valve 74 being put into a closed state (CL).

Figure 6:
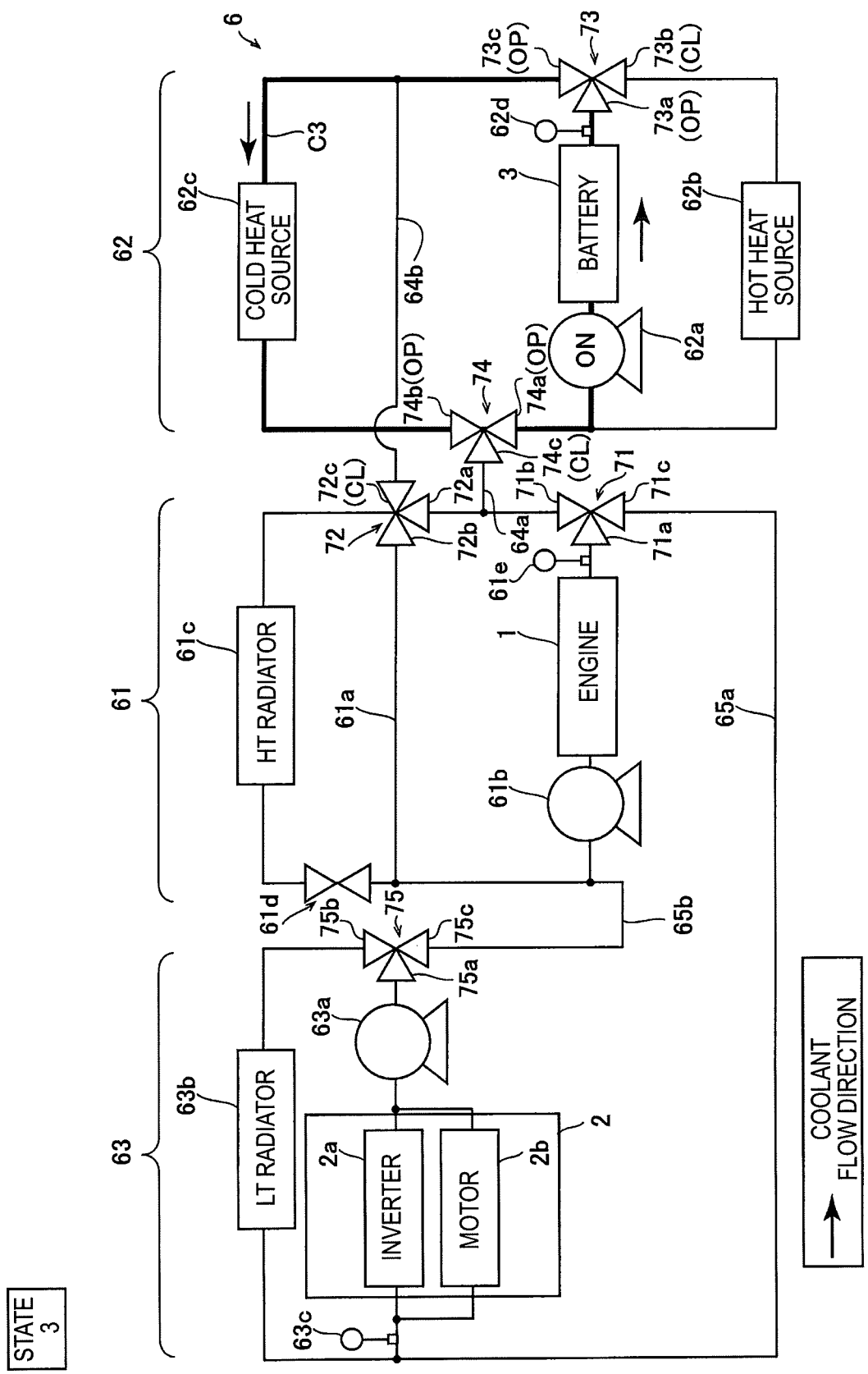
FIG. 6 is a circuit diagram illustrating State 3 of the heat exchange device according to the embodiment disclosed here.

As illustrated in FIG. 6, in another example, the non-communication state between the engine side circuit 61 and the battery side circuit 62 can be achieved and the coolant can be individually circulated in the engine side circuit 61 and the battery side circuit 62 by the outlets 73a and 73c of the three-way valve 73 and the outlets 74a and 74b of the three-way valve 74 being put into the open state (OP) and the outlet 72c of the three-way valve 72, the outlet 73b of the three-way valve 73, and the outlet 74c of the three-way valve 74 being put into the closed state (CL).

Figure 7:
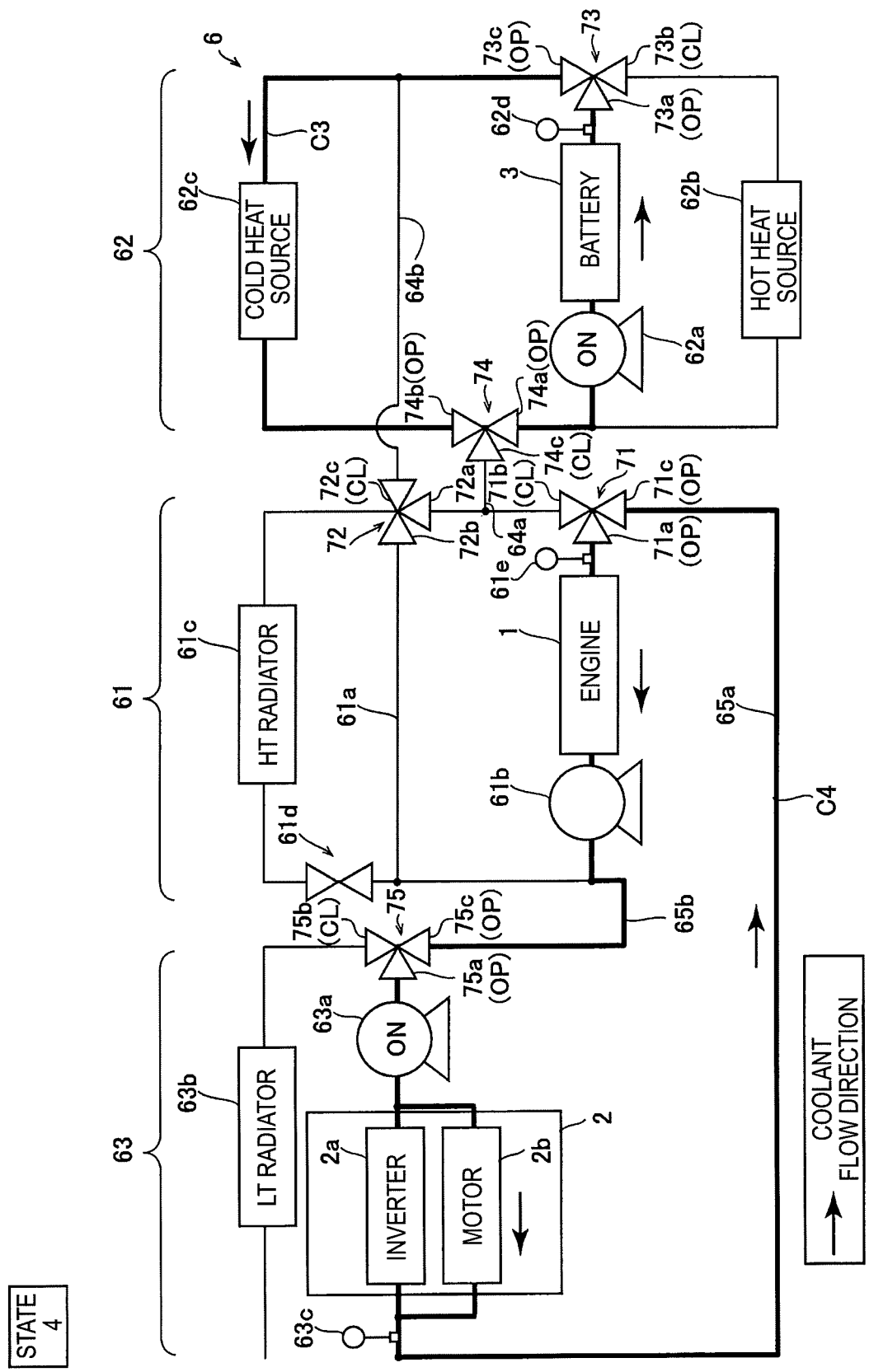
FIG. 7 is a circuit diagram illustrating State 4 of the heat exchange device according to the embodiment disclosed here.

In addition, in the heat exchange device 6 of the present embodiment, communication and non-communication states between the engine side circuit 61 and the electric drive unit side circuit 63 can be switched by the three-way valves 71, 72, and 75 (an example of a second valve portion). For example, as illustrated in FIG. 7, the communication state between the engine side circuit 61 and the electric drive unit side circuit 63 can be achieved and the coolant can be circulated between the engine side circuit 61 and the electric drive unit side circuit 63 by the outlets 71a and 71c of the three-way valve 71 and the outlets 75a and 75c of the three-way valve 75 being put into the open state (OP) and the outlet 71b of the three-way valve 71, the outlet 72c of the three-way valve 72, and the outlet 75b of the three-way valve 75 being put into the closed state (CL).

Figure 8:
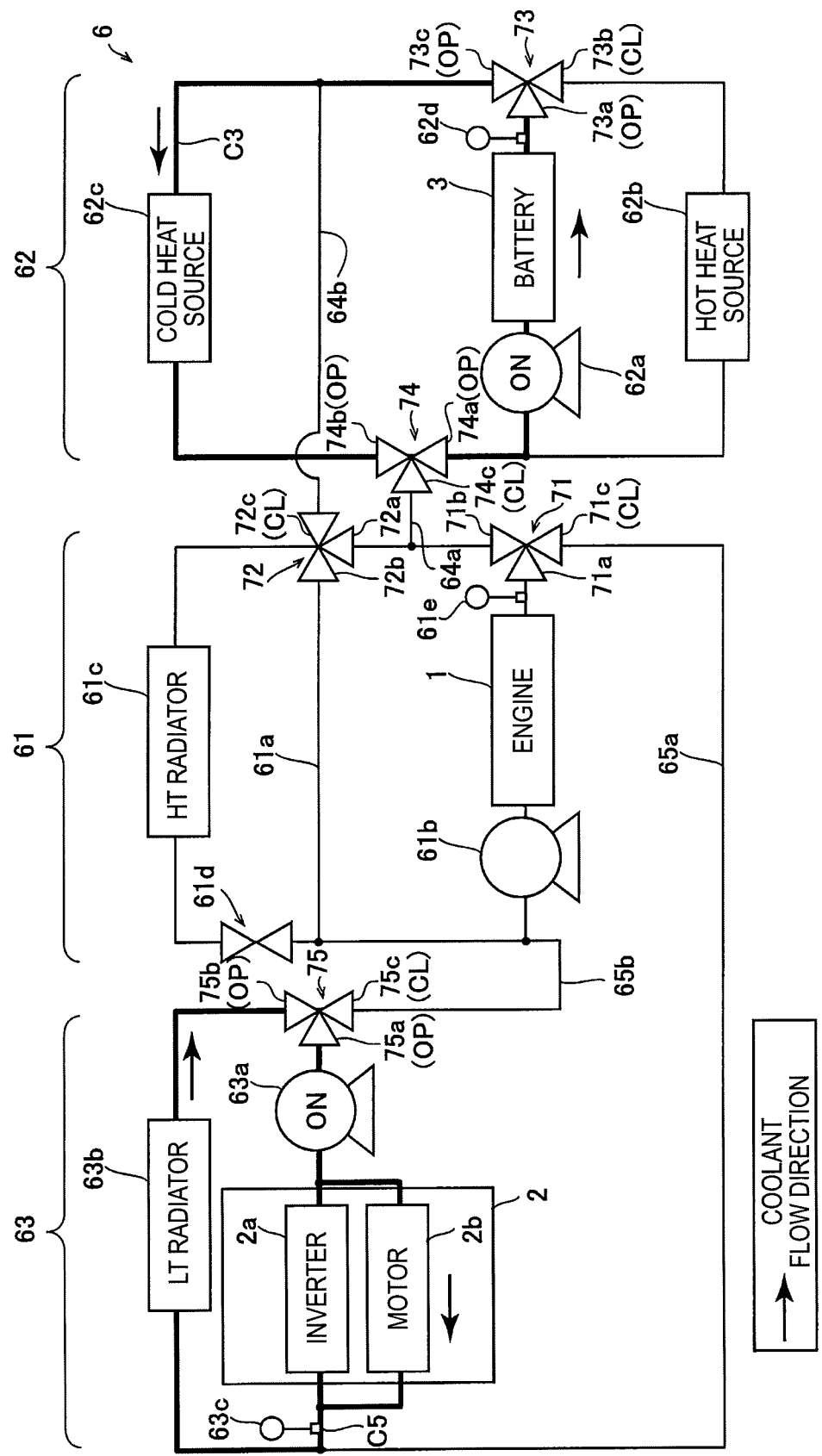
FIG. 8 is a circuit diagram illustrating State 5 of the heat exchange device according to the embodiment disclosed here.

As illustrated in FIG. 8, the non-communication state between the engine side circuit 61 and the electric drive unit side circuit 63 can be achieved and the coolant can be individually circulated in the engine side circuit 61 and the electric drive unit side circuit 63 by the outlets 75a and 75b of the three-way valve 75 being put into the open state (OP) and the outlet 71c of the three-way valve 71, the outlet 72c of the three-way valve 72, and the outlet 75c of the three-way valve 75 being put into the closed state (CL).

Temperature Raising and Cooling Control

The ECU 5 is configured to control temperature raising or cooling on any one or more of the engine 1 that is yet to be driven, the electric drive unit 2, and the battery 3 by using the heat exchange device 6 during charging of the battery 3 and the EV traveling. The ECU 5 is configured to control the temperature raising or cooling on any one or more of the engine 1 before driving, the electric drive unit 2, and the battery 3 based on the measurement result of the coolant temperature sensor 62d or 63c at this time. In addition, the ECU 5 is configured to control temperature raising or cooling on any one or more of the engine 1 before driving, the electric drive unit 2, and the battery 3 by using the heat exchange device 6 during the HV traveling. The ECU 5 is configured to control the temperature raising or cooling individually on the engine 1, the electric drive unit 2, and the battery 3 based on the driving state of the engine 1 and the measurement results of the coolant temperature sensors 61e, 62d, and 63c at this time. The temperature raising and cooling control of the ECU 5 will be described in detail below with reference to FIGS. 3A to 9.

During Battery Charging

The ECU 5 is configured to control temperature raising control on the engine 1 before driving and temperature raising or cooling control on the battery 3 based on the measurement result (battery temperature) from the coolant temperature sensor 62d during charging of the battery 3. Note that the description of the present embodiment assumes a case where the vehicle 100 is disposed in a low-temperature environment (temperature T0).

Figure 4:
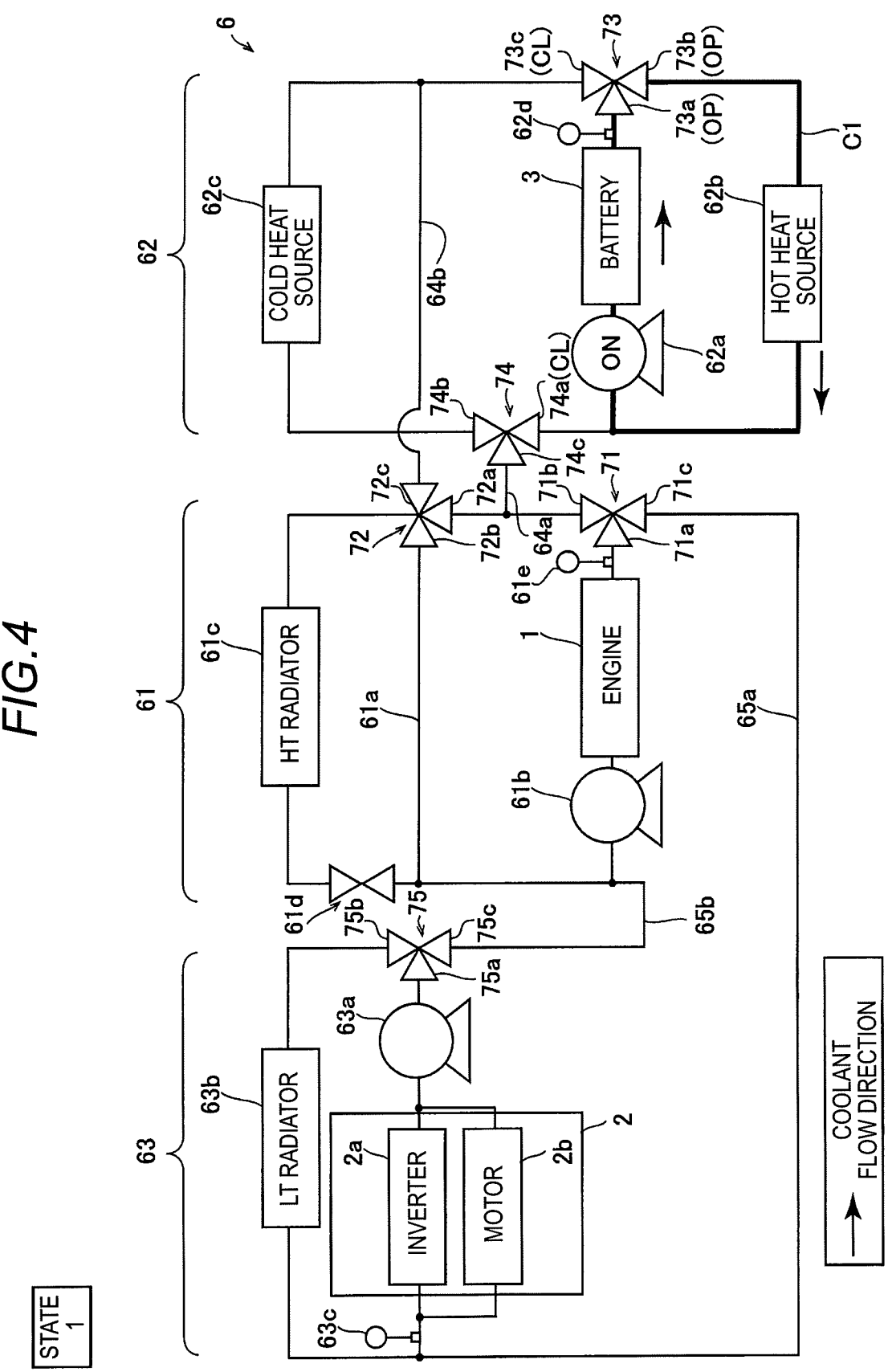
FIG. 4 is a circuit diagram illustrating State 1 of the heat exchange device according to the embodiment disclosed here.

Specifically, the ECU 5 first estimates a charging initiation time based on the state of charge (SOC) of the battery 3 and a charging termination time (planned EV traveling time) preset by a user or the like. When the ECU 5 determines that the current time is the charging initiation time, the ECU 5 causes a transition of the heat exchange device 6 to State 1 as the battery temperature (=temperature T0) is lower than a temperature T1 as illustrated in FIGS. 3A and 3B. As illustrated in FIG. 4, in this State 1, the outlets 73a and 73b of the three-way valve 73 are put into the open state (OP) and the outlet 73c of the three-way valve 73 and the outlet 74a of the three-way valve 74 are put into the closed state (CL). In addition, electric power is supplied to the electric water pump 62a and the hot heat source 62b by the ECU 5. As a result, the coolant flows through a circulation circuit C1 (indicated by a bold line in FIG. 4), which is constituted solely by the inside of the battery side circuit 62, and the temperature of the battery 3 is raised by the coolant being supplied to the battery 3 with the temperature of the coolant raised at the hot heat source 62b. As a result, it is possible to suppress charging of the battery 3 in a low-temperature state where charging efficiency is low.

Subsequently, the ECU 5 causes the heat exchange device 6 to undergo a transition to State 2 when the ECU 5 determines that the battery temperature of the battery 3 has reached the temperature T1 (an example of a first temperature threshold value) as a result of the temperature raising by the hot heat source 62b. As illustrated in FIG. 5, in this State 2, the outlets 71a and 71b of the three-way valve 71, the outlets 72b and 72c of the three-way valve 72, the outlets 73a and 73c of the three-way valve 73, and the outlets 74a and 74c of the three-way valve 74 are put into the open state (OP) and the outlet 71c of the three-way valve 71, the outlet 72a of the three-way valve 72, the outlet 73b of the three-way valve 73, and the outlet 74b of the three-way valve 74 are put into the closed state (CL). In addition, electric power is supplied to the electric water pump 62a by the ECU 5. As a result, the coolant flows through a circulation circuit C2 (indicated by a bold line in FIG. 5), which is formed by the communication state being achieved between the engine side circuit 61 and the battery side circuit 62. As a result, the battery 3 that generates heat by itself is cooled, the coolant warmed by the self-heat-generating battery 3 is supplied to the engine 1, and temperature raising before driving of the engine 1 is performed.

The electric water pump 61b, which consumes much electric power, is not driven in State 2. Accordingly, the electric power consumption that is required to maintain State 2 can be reduced.

Note that the temperature T1 is a temperature at which it is determined that the battery 3 initiates self-heat generation.

Subsequently, the ECU 5 causes the heat exchange device 6 to undergo a transition to State 3 when the ECU 5 determines that the battery temperature has reached a temperature T2 (an example of a second temperature threshold value), which exceeds the temperature T1, as a result of the temperature raising by the self-heat generation. As illustrated in FIG. 6, in this State 3, the outlets 73a and 73c of the three-way valve 73 and the outlets 74a and 74b of the three-way valve 74 are put into the open state (OP) and the outlet 72c of the three-way valve 72, the outlet 73b of the three-way valve 73, and the outlet 74c of the three-way valve 74 are put into the closed state (CL). In addition, electric power is supplied to the electric water pump 62a and the cold heat source 62c by the ECU 5. As a result, switching from the communication state to the non-communication state occurs between the engine side circuit 61 and the battery side circuit 62. The coolant flows through a circulation circuit C3 (indicated by a bold line in FIG. 6), which is constituted solely by the inside of the battery side circuit 62, and the battery 3 is cooled by the coolant being supplied to the battery 3 with the coolant cooled at the cold heat source 62c.

Note that the electric water pump 61b is not driven in the engine side circuit 61 in State 3. As a result, in the engine side circuit 61 in State 3, the coolant that is warmed in State 2 remains around the engine 1 without circulation, and thus the engine 1 is kept warm.

Note that the temperature T2 is a temperature at which it is determined that the battery 3 has generated more-than-necessary heat as a result of self-heat generation.

The ECU 5 is configured to return the heat exchange device 6 to State 2 illustrated in FIG. 5 when the ECU 5 determines that the battery temperature has reached a temperature T3, which is higher than the temperature T1 and lower than the temperature T2, by the battery 3 being cooled. As a result, the communication state between the engine side circuit 61 and the battery side circuit 62 is resumed and the temperature raising before driving of the engine 1 is performed again. By State 2 and State 3 being repeated, the battery 3 is cooled and the temperature of the engine 1 is raised until a point in time subsequent to charging termination. As a result, the temperature of the engine 1 is raised to some extent by the exhaust heat of the battery 3, and thus the warm-up time at the initiation of driving is shortened or reduced.

During EV Traveling

The ECU 5 is configured to control temperature raising control on the engine 1 before driving, cooling control on the electric drive unit 2, and cooling control on the battery 3 based mainly on the measurement result from the coolant temperature sensor 63c (electric drive unit temperature) during the EV traveling of the battery 3. Note that the description of the present embodiment assumes a case where the vehicle 100 undergoes a transition to the EV traveling immediately after charging termination.

Specifically, the ECU 5 first drives the electric drive unit 2 by supplying electric power from the battery 3 when the EV traveling is initiated. Then, the heat exchange device 6 is caused to undergo a transition to State 2 illustrated in FIG. 5. As a result, the communication state between the engine side circuit 61 and the battery side circuit 62 is achieved. The coolant warmed by the battery 3 that generates heat as a result of discharging is supplied to the engine 1, and thus temperature raising before driving of the engine 1 is performed. In addition, the temperature of the electric drive unit 2 is raised by the electric power supplied from the battery 3 becoming heat in part.

Subsequently, the ECU 5 causes the heat exchange device 6 to undergo a transition to State 4 when the ECU 5 determines that the electric drive unit temperature of the electric drive unit 2 has reached a temperature T4 (an example of a third temperature threshold value), which exceeds the temperature T2. As illustrated in FIG. 7, in this State 4, the outlets 71a and 71c of the three-way valve 71, the outlets 73a and 73c of the three-way valve 73, the outlets 74a and 74b of the three-way valve 74, and the outlets 75a and 75c of the three-way valve 75 are put into the open state (OP) and the outlet 71b of the three-way valve 71, the outlet 72c of the three-way valve 72, the outlet 73b of the three-way valve 73, the outlet 74c of the three-way valve 74, and the outlet 75b of the three-way valve 75 are put into the closed state (CL). In addition, electric power is supplied to the electric water pumps 62a and 63a and the cold heat source 62c by the ECU 5. As a result, switching from the communication state to the non-communication state occurs between the engine side circuit 61 and the battery side circuit 62. The coolant flows through the circulation circuit C3 (indicated by a bold line in FIG. 7), which is constituted solely by the inside of the battery side circuit 62, the coolant is cooled by the cold heat source 62c in the battery side circuit 62, and the battery 3 is cooled. Note that the heat exchange device 6 may be configured not to perform cooling of the battery 3 in a case where the temperature of the battery 3 is lower than the temperature T3 at this time.

In State 4, the communication state is achieved between the engine side circuit 61 and the electric drive unit side circuit 63. The coolant flows through a circulation circuit C4 (indicated by a bold line in FIG. 6), which is formed by the communication state being achieved between the engine side circuit 61 and the electric drive unit side circuit 63. As a result, the coolant warmed by the electric drive unit 2 is supplied to the engine 1, and thus temperature raising before driving of the engine 1 is performed.

In State 4, the electric water pump 61b is not driven in the engine side circuit 61.

Note that the temperature T4 is a temperature at which it is determined that the electric drive unit 2 is sufficiently raised in temperature as a result of driving.

Subsequently, the ECU 5 causes the heat exchange device 6 to undergo a transition to State 5 when the ECU 5 determines that the electric drive unit temperature of the electric drive unit 2 has reached a temperature T5, which exceeds the temperature T4. As illustrated in FIG. 8, in this State 5, the outlets 73a and 73c of the three-way valve 73, the outlets 74a and 74b of the three-way valve 74, and the outlets 75a and 75b of the three-way valve 75 are put into the open state (OP) and the outlet 71c of the three-way valve 71, the outlet 72c of the three-way valve 72, the outlet 73b of the three-way valve 73, the outlet 74c of the three-way valve 74, and the outlet 75c of the three-way valve 75 are put into the closed state (CL). In addition, electric power is supplied to the electric water pumps 62a and 63a and the cold heat source 62c by the ECU 5. As a result, switching from the communication state to the non-communication state occurs between the engine side circuit 61 and the electric drive unit side circuit 63. The coolant flows through a circulation circuit C5 (indicated by a bold line in FIG. 8), which is constituted solely by the inside of the electric drive unit side circuit 63, the coolant is supplied to the electric drive unit 2 with the coolant cooled in the low temperature radiator 63b, and the electric drive unit 2 is cooled. Suppressed as a result is a decline in drive efficiency attributable to driving of the inverter 2a and the motor 2b of the electric drive unit 2 in a high-temperature environment at or above the temperature T5. Note that cooling of the battery 3 is performed by the coolant being cooled by the cold heat source 62c in the battery side circuit 62 in State 5 as in State 4.

In State 5, the electric water pump 61b is not driven in the engine side circuit 61. As a result, the engine 1 is kept warm in State 5.

Note that the temperature T5 is a temperature at which it is determined that the electric drive unit 2 has generated more-than-necessary heat as a result of driving.

The ECU 5 is configured to return the heat exchange device 6 to State 4 illustrated in FIG. 8 when the ECU 5 determines that the electric drive unit temperature has reached a temperature T6, which is higher than the temperature T4 and lower than the temperature T5, by the electric drive unit 2 being cooled. As a result, the communication state between the engine side circuit 61 and the electric drive unit side circuit 63 is resumed and the temperature raising before driving of the engine 1 is performed again. Subsequently, State 4 and State 5 are repeated. As a result, the temperature of the engine 1 is further raised by the exhaust heat of the battery 3 and the electric drive unit 2, and thus the warm-up time at the initiation of driving is further shortened or reduced.

During HV Traveling

Figure 9:
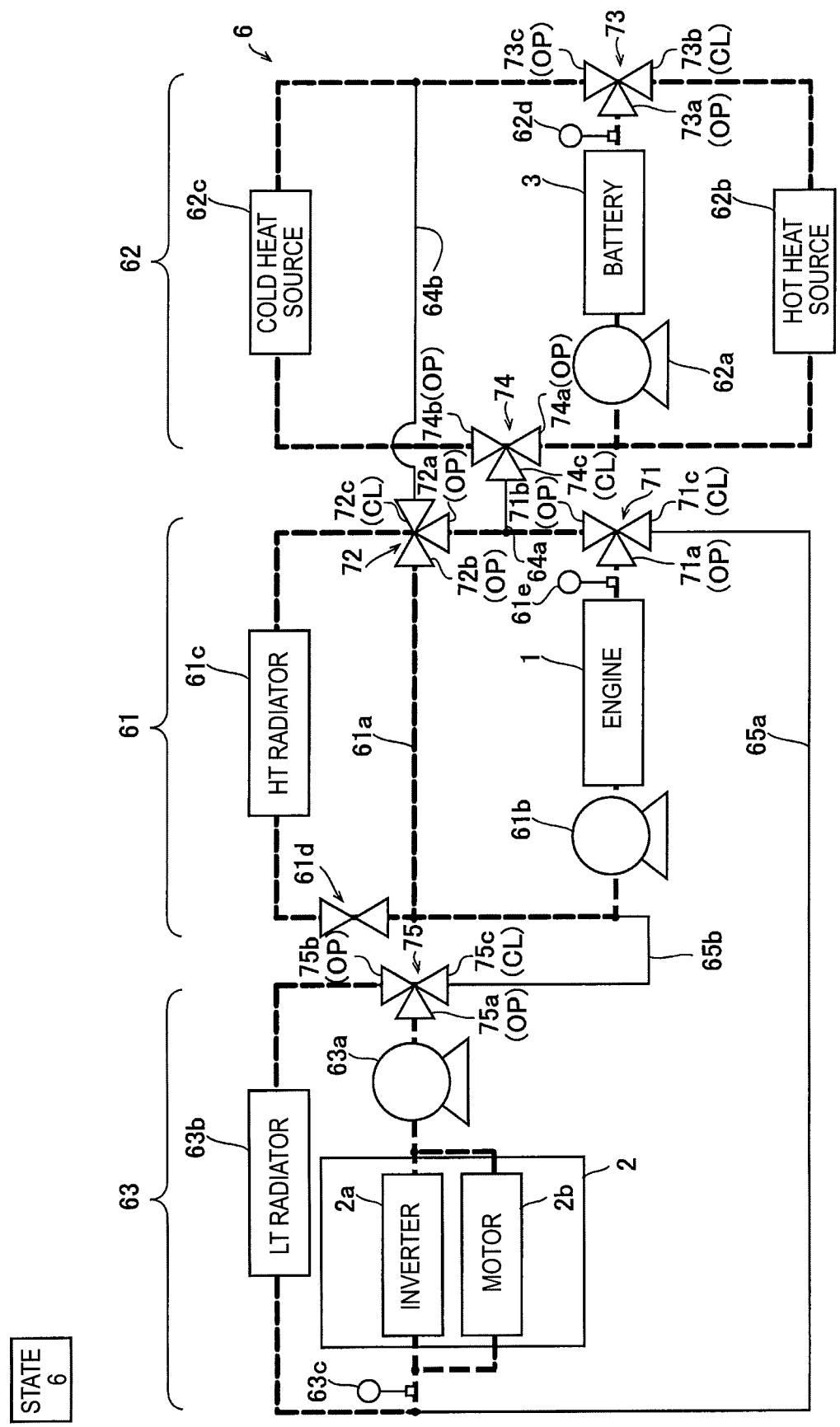
FIG. 9 is a circuit diagram illustrating State 6 of the heat exchange device according to the embodiment disclosed here.

When the ECU 5 determines from the operation state of the vehicle 100 or the like that a transition from the EV traveling to the HV traveling needs to be performed, the ECU 5 causes the heat exchange device 6 to undergo a transition to State 6. As illustrated in FIG. 9, in this State 6, the outlets 71a and 71b of the three-way valve 71, the outlets 72a and 72b of the three-way valve 72, the outlets 73a and 73c of the three-way valve 73, the outlets 74a and 74b of the three-way valve 74, and the outlets 75a and 75b of the three-way valve 75 are put into the open state (OP) and the outlet 71c of the three-way valve 71, the outlet 72c of the three-way valve 72, the outlet 73b of the three-way valve 73, the outlet 74c of the three-way valve 74, and the outlet 75c of the three-way valve 75 are put into the closed state (CL). As a result, the non-communication state is achieved between the engine side circuit 61 and the battery side circuit 62 and between the engine side circuit 61 and the electric drive unit side circuit 63.

In State 6, the ECU 5 performs individual control in each of the engine side circuit 61, the battery side circuit 62, and the electric drive unit side circuit 63. In other words, in the engine side circuit 61, the thermostat valve 61d is opened and electric power is supplied to the electric water pump 61b by the ECU 5 when the coolant of the engine side circuit 61 is raised in temperature as a result of driving of the engine 1 and the engine temperature exceeds the temperature T7. As a result, cooling of the engine 1 is performed by the coolant being quickly cooled by the high temperature radiator 61c. In the battery side circuit 62, the ECU 5 supplies electric power to the electric water pump 62a and the cold heat source 62c (or the hot heat source 62b) when the ECU 5 determines that the battery temperature has reached the temperature T2. As a result, cooling of the battery 3 is performed by the coolant being cooled by the cold heat source 62c or the temperature of the battery 3 is raised by the temperature of the coolant being raised by the hot heat source 62b. In the electric drive unit side circuit 63, the ECU 5 supplies electric power to the electric water pump 63a when the ECU 5 determines that the electric drive unit temperature has reached the temperature T5. As a result, cooling of the electric drive unit 2 is performed by the coolant being cooled by the low temperature radiator 63b.

Here, in State 6, the non-communication state is achieved between the engine side circuit 61 and the battery side circuit 62 and between the engine side circuit 61 and the electric drive unit side circuit 63. Accordingly, supply of a high-temperature coolant raised in temperature by the engine 1 to the battery 3 or the electric drive unit 2 can be suppressed.

Next, a control flow of the ECU 5 (see FIG. 1) related to control of the heat exchange device 6 during charging will be described with reference to FIG. 10.

As illustrated in FIG. 10, firstly in Step S1, the ECU 5 determines whether or not the current time is a charging initiation time and this control is repeated until it is determined that the current time is a charging initiation time. Then, in Step S2, the ECU 5 determines, based on the measurement result of the coolant temperature sensor 62d, whether or not the battery temperature is lower than the temperature T1. In a case where it is determined in Step S2 that the battery temperature is lower than the temperature T1, the ECU 5 causes the heat exchange device 6 to undergo a transition to State 1 in Step S3. As a result, temperature raising is performed on the battery 3. Then, returning to Step S2, the ECU 5 determines again whether or not the battery temperature is lower than the temperature T1.

In a case where it is determined in Step S2 that the battery temperature is equal to or higher than the temperature T1, the ECU 5 causes the heat exchange device 6 to undergo a transition to State 2 in Step S4. As a result, the self-heat-generating battery 3 is cooled and temperature raising before driving of the engine 1 is performed by the heat of the battery 3.

Then, in Step S5, the ECU 5 determines whether or not the battery temperature exceeds the temperature T2 and this control is repeated until it is determined that the battery temperature exceeds the temperature T2. In a case where it is determined that the battery temperature exceeds the temperature T2, the ECU 5 causes the heat exchange device 6 to undergo a transition to State 3 in Step S6. As a result, the self-heat-generating battery 3 is cooled and the engine 1 is kept warm.

Then, in Step S7, the ECU 5 determines whether or not the battery temperature is lower than the temperature T3. In a case where it is determined in Step S7 that the battery temperature is equal to or higher than the temperature T3, the ECU 5 causes the heat exchange device 6 to undergo a transition to State 3 in Step S8. Then, the process proceeds to Step S10. In a case where it is determined in Step S7 that the battery temperature is lower than the temperature T3, the ECU 5 causes the heat exchange device 6 to undergo a transition to State 2 in Step S9. Then, the process proceeds to Step S10.

In Step S10, the ECU 5 determines whether or not the current time is a charging termination time. The process returns to Step S7 in a case where it is determined in Step S10 that the current time is not a charging termination time. In a case where it is determined in Step S10 that the current time is a charging termination time, charging of the battery 3 is terminated and the control flow during charging is terminated.

Next, a control flow of the ECU 5 (see FIG. 1) related to control of the heat exchange device 6 during the EV traveling will be described with reference to FIG. 11.

As illustrated in FIG. 11, firstly in Step S11, the ECU 5 determines whether or not the EV traveling has started and this control is repeated until it is determined that the EV traveling has started. Then, in Step S12, the ECU 5 causes the heat exchange device 6 to undergo a transition to State 2. As a result, the battery 3 that generates heat as a result of discharging is cooled and temperature raising before driving of the engine 1 is performed.

Then, in Step S13, it is determined whether or not the electric drive unit temperature exceeds the temperature T4 and this control is repeated until it is determined that the electric drive unit temperature exceeds the temperature T4. In a case where it is determined that the electric drive unit temperature exceeds the temperature T4, the ECU 5 causes the heat exchange device 6 to undergo a transition to State 4 in Step S14. As a result, cooling of the battery 3 and the electric drive unit 2 is performed and temperature raising before driving of the engine 1 is performed by the heat of the electric drive unit 2.

Then, in Step S15, it is determined whether or not the electric drive unit temperature exceeds the temperature T5 and this control is repeated until it is determined that the electric drive unit temperature exceeds the temperature T5. In a case where it is determined that the electric drive unit temperature exceeds the temperature T5, the ECU 5 causes the heat exchange device 6 to undergo a transition to State 5 in Step S16. As a result, cooling of the battery 3 and the electric drive unit 2 is performed and the engine 1 is kept warm.

Then, in Step S17, it is determined whether or not the electric drive unit temperature is lower than the temperature T6. In a case where it is determined in Step S17 that the electric drive unit temperature is equal to or higher than the temperature T6, the ECU 5 causes the heat exchange device 6 to undergo a transition to State 5 in Step S18. Then, the process proceeds to Step S20. In a case where it is determined in Step S17 that the electric drive unit temperature is lower than the temperature T6, the ECU 5 causes the heat exchange device 6 to undergo a transition to State 4 in Step S19. Then, the process proceeds to Step S20.

In Step S20, the ECU 5 determines whether or not switching to the HV traveling has occurred with the EV traveling terminated. The process returns to Step S17 in a case where it is determined in Step S20 that the EV traveling is yet to be terminated. In a case where it is determined in Step S20 that switching to the HV traveling has occurred, the ECU 5 switches to HV traveling and the heat exchange device 6 undergoes a transition to State 6. Then, the control flow during the EV traveling is terminated. During the HV traveling, the ECU 5 performs cooling control individually in each of the engine side circuit 61, the battery side circuit 62, and the electric drive unit side circuit 63.

Effect of Present Embodiment

The following effects can be achieved from the present embodiment.

As described above, in the present embodiment, the communication state between the engine side circuit 61 and the battery side circuit 62 is achieved by the three-way valves 71 to 74. Accordingly, the coolant of the battery side circuit 62 that is warmed by heat exchange with the battery 3 is allowed to flow in the engine side circuit 61 in the communication state. As a result, the heat of the battery 3 can be used for temperature raising before driving of the engine 1, and thus the engine 1 that is raised in temperature in advance before driving can be driven with combustion efficiency improved. Therefore, the heat that is generated in the battery 3 can be effectively used for a rise in the temperature of the engine 1.

In the present embodiment, the battery 3 and the engine 1 can be thermally separated from each other by the non-communication state being achieved between the engine side circuit 61 and the battery side circuit 62 by the three-way valves 71 to 74. As a result, it is possible to suppress supply of a large amount of heat to the battery 3 from the engine 1 in which much heat is generated as a result of driving, and thus it is possible to suppress the occurrence of troubles of the battery 3 attributable to a large amount of heat.

In the present embodiment, the ECU 5 causes the heat exchange device 6 to undergo a transition to State 2, where temperature raising before driving of the engine 1 is performed by the heat of the battery 3, when the ECU 5 determines that the battery temperature of the battery 3 is equal to or higher than the temperature T1 as a result of the temperature raising by the hot heat source 62b. In this manner, it is possible to perform temperature raising before driving of the engine 1 by the heat of the battery 3 in a state where the temperature of the battery 3 is sufficiently raised to at least the temperature T1. As a result, it is possible to suppress a decline in the efficiency of charging of the battery 3 as compared with a case where the heat of the battery 3 is used in a state where the battery 3 is insufficiently raised in temperature.

In the present embodiment, the ECU 5 causes the heat exchange device 6 to undergo a transition to State 3, where cooling of the battery 3 is performed by means of the cold heat source 62c, when the ECU 5 determines that the battery temperature is equal to or higher than the temperature T2, which exceeds the temperature T1. Accordingly, the battery 3 can be reliably cooled by means of the cold heat source 62c when the temperature of the battery 3 is raised to at least the temperature T2, and thus the battery 3 can be maintained at a stable temperature. Further, by the non-communication state being achieved between the engine side circuit 61 and the battery side circuit 62 by the three-way valves 71 to 74, flowing of a cooled coolant to the engine side circuit 61 can be suppressed. As a result, it is possible to suppress unnecessary cooling of the engine 1 and it is possible to suppress a decline in engine temperature.

In the present embodiment, the communication state between the engine side circuit 61 and the electric drive unit side circuit 63 is achieved by the three-way valves 71, 72, and 75. Accordingly, the heat of the motor 2b driven by the electric power discharged from the battery 3 as well as the heat of the battery 3 can be used for temperature raising before driving of the engine 1. As a result, the engine 1 that is raised in temperature in advance before driving can be driven with combustion efficiency further improved. In addition, the motor 2b and the engine 1 can be thermally separated from each other by the non-communication state being achieved between the engine side circuit 61 and the electric drive unit side circuit 63 by the three-way valves 71, 72, and 75. As a result, it is possible to suppress the occurrence of troubles of the motor 2b attributable to much heat resulting from driving of the engine 1 being supplied in quantity from the engine 1 to the motor 2b.

In the present embodiment, the ECU 5 causes the heat exchange device 6 to undergo a transition to State 4, where temperature raising before driving of the engine 1 is performed by the heat of the electric drive unit 2, when the ECU 5 determines that the electric drive unit temperature is equal to or higher than the temperature T4. In this manner, it is possible to perform temperature raising before driving of the engine 1 by the heat of the motor 2b in a state where the temperature of the motor 2b is sufficiently raised to at least the temperature T4. As a result, it is possible to suppress a decline in the drive efficiency of the motor 2b as compared with a case where the heat of the motor 2b is used in a state where the motor 2b is insufficiently raised in temperature.

In the present embodiment, cooling of the battery 3 is performed by the coolant being cooled by the cold heat source 62c in State 4. Accordingly, it is possible to suppress a more-than-necessary rise in the temperature of the battery 3 generating heat by discharging with respect to the motor 2b. As a result, the battery 3 can be maintained at a stable temperature.

In the present embodiment, the communication state between the engine side circuit 61 and the battery side circuit 62 is achieved by the three-way valves 71 to 74 in a case where the battery temperature is equal to or higher than the temperature T1 when the battery 3 is charged by the external power source 101. As a result, it is possible to perform temperature raising before driving of the engine 1 by the heat of the battery 3 in a state where the temperature of the battery 3 is sufficiently raised to at least the temperature T1, and thus it is possible to suppress a decline in the efficiency of charging of the battery 3 by means of the external power source 101.

In the present embodiment, the temperature T1 at a time of transition to State 2 is a temperature at which it can be determined that the battery 3 initiates self-heat generation as a result of charging by the external power source 101. Accordingly, the heat exchange device 6 can be configured to start supplying heat to the engine 1 when the battery 3 undergoes a transition to a state where heat continues to be generated by self-heat generation, and thus the temperature of the engine 1 can be reliably raised by the heat of the battery 3. As a result, the engine 1 that is raised in temperature in advance before driving can be driven with combustion efficiency further improved.

In the present embodiment, the heat exchange device 6 is configured such that the coolant flowing through the electric drive unit side circuit 63 exchanges heat with the motor 2b and the inverter 2a. As a result, the heat of the inverter 2a as well as the heat of the motor 2b driven by the electric power discharged from the battery 3 can be used for temperature raising before driving of the engine 1.

In the present embodiment, the non-communication state between the engine side circuit 61 and the battery side circuit 62 is achieved by the three-way valves 71 to 74 and the non-communication state between the engine side circuit 61 and the electric drive unit side circuit 63 is achieved by the three-way valves 71, 72, and 75 after the engine 1 is driven through switching to the HV traveling. Then, the engine 1, the battery 3, and the motor 2b are individually cooled by the high temperature radiator 61c, the cold heat source 62c, and the low temperature radiator 63b, respectively. As a result, cooling control can be performed on each of the engine 1, the battery 3, and the motor 2b, which have different temperature ranges suitable for driving, such that a suitable temperature is reached.

In the present embodiment, the electric water pump 61b for flowing of the coolant of the engine side circuit 61 is provided on the path of the engine side circuit 61 and the electric water pump 62a for flowing of the coolant of the battery side circuit 62 is provided on the path of the battery side circuit 62. Accordingly, the coolant is capable of individually flowing inside each of the engine side circuit 61 and the battery side circuit 62 even in a state where the engine side circuit 61 and the battery side circuit 62 do not communicate with each other. In addition, the electric water pumps 61b and 62a are electric, and thus coolant flow control can be individually and appropriately performed.

In the present embodiment, the hot heat source 62b that raises the temperature of the battery 3 is provided, and thus a decline in the charging and discharging efficiency of the battery 3 attributable to an excessively low battery temperature can be suppressed by the temperature of the battery 3 being raised by the hot heat source 62b being driven.

MODIFICATION EXAMPLE

Note that the embodiment disclosed this time is an example in all respects and is not restrictive. The scope disclosed here is indicated not by the description of the above embodiment but by the appended claims and includes meanings equivalent to the appended claims and every modification (modification example) within the scope.

For example, although the above embodiment is an example in which the coolant temperature measured by the coolant temperature sensor 61e (62d, 63c) disposed on the downstream side of the engine 1 (battery 3, electric drive unit 2) is the engine temperature (battery temperature, electric drive unit temperature), this disclosure is not limited to the example. In this disclosure, the directly measured temperatures of the internal combustion engine, the electric power storage unit, and the drive motor rather than the coolant temperature may be the temperature of the internal combustion engine, the temperature of the electric power storage unit, and the temperature of the drive motor, respectively.

Although the above embodiment is an example that has a configuration in which the heat exchange device 6 is returned to State 2, where temperature raising before driving of the engine 1 is performed by the heat of the battery 3, when it is determined that the battery temperature has reached the temperature T3, which is higher than the temperature T1 and lower than the temperature T2, this disclosure is not limited to the example. In an alternative exemplary configuration, temperature raising before driving of the internal combustion engine may be performed on the heat exchange device by the heat of the battery when it is determined that the battery temperature has dropped to the temperature T1.

Although the above embodiment is an example that has a configuration in which the heat exchange device 6 is returned to State 4, where temperature raising before driving of the engine 1 is performed by the heat of the electric drive unit 2, when it is determined that the electric drive unit temperature has reached the temperature T6, which is higher than the temperature T4 and lower than the temperature T5, this disclosure is not limited to the example. In an alternative exemplary configuration, temperature raising before driving of the internal combustion engine may be performed on the heat exchange device by the heat of the electric drive unit when it is determined that the electric drive unit temperature has dropped to the temperature T4.

Although the above embodiment is an example in which the heat exchange device 6 undergoes a transition to State 2, where temperature raising before driving of the engine 1 is performed by the heat of the battery 3 (electric power storage unit), at the initiation of the EV traveling, this disclosure is not limited to the example. In this disclosure, the heat exchange device may undergo a transition to State 1, where the electric power storage unit is raised in temperature by the hot heat source, in a case where the electric power storage unit is cooled by outside air at the initiation of the EV traveling. In this manner, the discharging efficiency of the electric power storage unit can be improved. In this case, it is preferable that the heat exchange device undergoes a transition to State 2 with the electric power storage unit sufficiently raised in temperature and the discharging efficiency sufficiently improved.

Although the above embodiment is an example in which the vehicle 100 provided with the heat exchange device 6 is a PHV that is configured to be capable of performing driving such as traveling by using one or both of the engine 1 (internal combustion engine) and the electric drive unit 2 and is configured such that the battery 3 (electric power storage unit) can be charged from the external power source 101 via the charger 4, this disclosure is not limited to the example. In this disclosure, the vehicle is not limited to a PHV as long as the vehicle is provided with an internal combustion engine and an electric power storage unit that can be charged and discharged. For example, the vehicular heat exchange device disclosed here may be used for a vehicle that performs driving such as traveling by using only an electric drive unit and uses an internal combustion engine only for electric power generation during charging of an electric power storage unit. In addition, the vehicular heat exchange device disclosed here may be used for a hybrid vehicle (HV) in which electric power storage in an electric power storage unit is performed by electric power generation by an internal combustion engine and electric power generation by regeneration without a configuration that allows charging from an external power source.

Although the above embodiment is an example in which the heat exchange device 6 includes the engine side circuit 61 (first medium flow circuit), the battery side circuit 62 (second medium flow circuit), and the electric drive unit side circuit (third medium flow circuit) and each of the circuits is a coolant circuit through which the coolant (heat exchange medium) flows, this disclosure is not limited to the example. In this disclosure, the heat exchange device may not include the third medium flow circuit, through which the heat exchange medium exchanges heat with the drive motor flows, as long as the heat exchange device includes at least the first medium flow circuit and the second medium flow circuit each allowing the heat exchange medium to flow. In addition, the heat exchange device may further include a medium flow circuit through which a heat exchange medium exchanges heat with a heat generation source other than the drive motor and the electric power storage unit flows.

Although the above embodiment is an example in which water (coolant) is used as a heat exchange medium, this disclosure is not limited to the example. In this disclosure, the heat exchange medium is not limited to water and may be any heat-exchangeable fluid (gas or liquid).

The coolant circuit of the heat exchange device 6 in the above embodiment is an example. In this disclosure, the configuration of the vehicular heat exchange device is not limited to the configuration of the above embodiment.

A vehicular heat exchange device according to one aspect of this disclosure includes a first medium flow circuit through which a heat exchange medium that exchanges heat with an internal combustion engine flows; a second medium flow circuit through which the heat exchange medium that exchanges heat with an electric power storage unit that can be charged and discharged flows; and a first valve portion switching between a communication state and a non-communication state between the first medium flow circuit and the second medium flow circuit, in which the vehicular heat exchange device is configured such that the first valve portion causes the first medium flow circuit and the second medium flow circuit to be in the communication state to raise a temperature of the internal combustion engine before driving of the internal combustion engine using heat of the electric power storage unit.

The vehicular heat exchange device according to the aspect of this disclosure is configured as described above. Accordingly, the first valve portion causes the first medium flow circuit and the second medium flow circuit to be in the communication state and the heat exchange medium of the second medium flow circuit that is warmed by heat exchange with the electric power storage unit is allowed to flow in the first medium flow circuit being in the communication state with the second medium flow circuit. As a result, the heat of the electric power storage unit can be used for raising the temperature of the internal combustion engine before driving of the internal combustion engine, and thus the internal combustion engine that is raised in temperature in advance before driving can be driven with combustion efficiency improved. Therefore, the heat that is generated in the electric power storage unit can be effectively used for rising the temperature of the internal combustion engine.

In the vehicular heat exchange device according to the aspect, the electric power storage unit and the internal combustion engine can be thermally separated from each other by causing the first medium flow circuit and the second medium flow circuit to be in the non-communication state by the first valve portion. As a result, it is possible to suppress supply of a large amount of heat to the electric power storage unit from the internal combustion engine in which much heat is generated as a result of driving, and thus it is possible to suppress the occurrence of troubles of the electric power storage unit attributable to a large amount of heat.

In the vehicular heat exchange device according to the aspect, it is preferable that the vehicular heat exchange device is configured such that the first valve portion causes the first medium flow circuit and the second medium flow circuit to be in the communication state to raise the temperature of the internal combustion engine before the driving of the internal combustion engine using the heat of the electric power storage unit in a case where a temperature of the electric power storage unit becomes at least a first temperature threshold value.

With the above-described configuration, it is possible to raise the temperature of the internal combustion engine before driving of the internal combustion engine by the heat of the electric power storage unit in a state where the temperature of the electric power storage unit is sufficiently raised to at least the first temperature threshold value. As a result, it is possible to suppress a decline in, for example, the efficiency of charging and discharging of the electric power storage unit as compared with a case where the heat of the electric power storage unit is used in a state where the electric power storage unit is insufficiently raised in temperature.

In this case, it is preferable that the vehicular heat exchange device further includes an electric power storage unit cooling unit provided on a path of the second medium flow circuit and cooling the heat exchange medium flowing through the second medium flow circuit and the vehicular heat exchange device is configured such that the first valve portion causes the first medium flow circuit and the second medium flow circuit to be switched from the communication state to the non-communication state to cool the electric power storage unit by the heat exchange medium being cooled in the electric power storage unit cooling unit of the second medium flow circuit in a case where the temperature of the electric power storage unit becomes at least a second temperature threshold value exceeding the first temperature threshold value.

With the above-described configuration, the electric power storage unit can be reliably cooled by means of the electric power storage unit cooling unit when the temperature of the electric power storage unit is raised to at least the second temperature threshold value, and thus the electric power storage unit can be maintained at a stable temperature. Further, by causing the first medium flow circuit and the second medium flow circuit to be in the non-communication state by the first valve portion, flowing of the cooled heat exchange medium to the first medium flow circuit can be suppressed. As a result, it is possible to suppress unnecessary cooling of the internal combustion engine and it is possible to suppress a decline in the temperature of the internal combustion engine.

In the vehicular heat exchange device according to the aspect, it is preferable that the electric power storage unit is configured to be chargeable by an external power source, and the first valve portion causes the first medium flow circuit and the second medium flow circuit to be in the communication state in a case where the temperature of the electric power storage unit becomes at least the first temperature threshold value during charging of the electric power storage unit by the external power source.

The electric power storage unit can be raised in the temperature during charging by the external power source, the heat of the electric power storage unit resulting from the charging is allowed to act on the internal combustion engine when the temperature of the electric power storage unit becomes at least the first temperature threshold value, and the temperature of the internal combustion engine can be raised before driving of the internal combustion engine.

In the vehicular heat exchange device according to the aspect, it is preferable that the vehicular heat exchange device further includes a third medium flow circuit through which the heat exchange medium that exchanges heat with a drive motor driven by electric power discharged from the electric power storage unit flows and a second valve portion switching between a communication state and a non-communication state between the first medium flow circuit and the third medium flow circuit.

With the above-described configuration, the heat of the drive motor driven by the electric power discharged from the electric power storage unit as well as the heat of the electric power storage unit can be used for raising the temperature of the internal combustion engine before driving of the internal combustion engine. As a result, the internal combustion engine that is raised in temperature in advance before driving can be driven with combustion efficiency further improved. In addition, since the second valve portion causes the first medium flow circuit and the third medium flow circuit to be the non-communication state, the drive motor and the internal combustion engine can be thermally separated from each other. As a result, it is possible to suppress the occurrence of troubles of the drive motor attributable to supply of a large amount of heat to the drive motor from the internal combustion engine in which much heat is generated as a result of driving.

In this case, it is preferable that the vehicular heat exchange device is configured such that the first valve portion causes the first medium flow circuit and the second medium flow circuit to be the non-communication state and the second valve portion causes the first medium flow circuit and the third medium flow circuit to be the communication state to raise the temperature of the internal combustion engine before driving of the internal combustion engine by heat of the drive motor switched from the heat of the electric power storage unit in a case where a temperature of the drive motor becomes at least a third temperature threshold value.

With the above-described configuration, it is possible to raise the temperature of the internal combustion engine before driving of the internal combustion engine by the heat of the drive motor in a state where the temperature of the drive motor is sufficiently raised to at least the third temperature threshold value. As a result, it is possible to suppress a decline in the drive efficiency of the drive motor as compared with a case where the heat of the drive motor is used in a state where the drive motor is insufficiently raised in temperature.

In the configuration in which the heat of the drive motor occurs the temperature of the internal combustion engine is raised before driving of the internal combustion engine by being switched to the heat, it is preferable that the vehicular heat exchange device is configured such that the electric power storage unit is cooled by the heat exchange medium being cooled in the electric power storage unit cooling unit of the second medium flow circuit while raising the temperature of the internal combustion engine before the driving of the internal combustion engine by the heat of the drive motor switched from the heat of the electric power storage unit in a case where the temperature of the drive motor is the third temperature threshold value or more.

With the above-described configuration, it is possible to suppress an excess rise in the temperature of the electric power storage unit generating heat by discharging with respect to the drive motor. As a result, the electric power storage unit can be maintained at a stable temperature.

In the vehicular heat exchange device according to the aspect, it is preferable that. In the configuration in which the third medium flow circuit and the second valve portion are formed, an inverter that converts a direct current discharged from the electric power storage unit into an alternating current to be supplied to the drive motor is provided on the path of the third medium flow circuit, the inverter, and the heat exchange medium flowing through the third medium flow circuit is configured to exchange heat with the drive motor and the inverter.

With the above-described configuration, in addition to the drive motor, the inverter which is a heating element can be used for raising the temperature of the internal combustion engine before driving of the internal combustion engine, and thus the temperature of the internal combustion engine can be raised earlier.

In the vehicular heat exchange device according to the aspect, it is preferable that in the configuration in which the first to third medium flow circuits and the first and second valve portions are formed, the vehicular heat exchange device further includes an internal combustion engine cooling unit provided on the path of the first medium flow circuit and cooling the heat exchange medium flowing through the first medium flow circuit, and a motor cooling unit provided on the path of the third medium flow circuit and cooling the heat exchange medium flowing through the third medium flow circuit, and after the internal combustion engine is started to be driven, the first valve portion causes the first medium flow circuit and the second medium flow circuit to be the non-communication state and the second valve portion causes the first medium flow circuit and the third medium flow circuit to be the non-communication state to cool the internal combustion engine, the electric power storage unit, and the drive motor individually by the internal combustion engine cooling unit, the electric power storage unit cooling unit, and the motor cooling unit, respectively.

With the above-described configuration, each of the internal combustion engine, the drive motor and the inverter as heating elements, and the heat exchange medium receiving the heat of the heating elements can be cooled. Accordingly, each of the internal combustion engine, the drive motor, and the inverter can be maintained at a temperature allowing an appropriate operation without an excess rise in the temperatures of the heating elements.

In the vehicular heat exchange device according to the aspect, it is preferable that the first temperature threshold value is set such that a difference from an outside air temperature is a predetermined value or more.

With the above-described configuration, by setting the first temperature threshold value to have the predetermined value or more of the difference from an outside air temperature, self-heat generation of the electric power storage unit resulting from charging can be detected.

APPENDICES

Note that the following other configurations are conceivable apart from the vehicular heat exchange device according to the aspect of this disclosure.

(Appendix 1)

In the vehicular heat exchange device according to the aspect, the vehicular heat exchange device further includes a first electric pump provided on the path of the first medium flow circuit and allowing the heat exchange medium of the first medium flow circuit to flow and a second electric pump provided on the path of the second medium flow circuit and allowing the heat exchange medium of the second medium flow circuit to flow.

(Appendix 2)

In the vehicular heat exchange device according to the aspect, the heat exchange medium is water.

(Appendix 3)

In the vehicular heat exchange device according to the aspect, the vehicular heat exchange device further includes a hot heat source performing temperature raising on the electric power storage unit.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicular heat exchange device comprising:
   a first medium flow circuit through which a heat exchange medium that exchanges heat with an internal combustion engine flows;
   a second medium flow circuit through which the heat exchange medium that exchanges heat with an electric power storage unit that can be charged and discharged flows;
   a third medium flow circuit through which the heat exchange medium that exchanges heat with a drive motor driven by electric power discharged from the electric power storage unit flows;
   a first valve portion switching between a communication state and a non-communication state between the first medium flow circuit and the second medium flow circuit; and
   a second valve portion switching between a communication state and a non-communication state between the first medium flow circuit and the third medium flow circuit,
   wherein the vehicular heat exchange device is configured such that the first valve portion causes the first medium flow circuit and the second medium flow circuit to be in the communication state to raise a temperature of the internal combustion engine before driving of the internal combustion engine using heat of the electric power storage unit, and
   wherein the vehicular heat exchange device is configured such that the first valve portion causes the first medium flow circuit and the second medium flow circuit to be the non-communication state and the second valve portion causes the first medium flow circuit and the third medium flow circuit to be the communication state to raise the temperature of the internal combustion engine before driving of the internal combustion engine by heat of the drive motor switched from the heat of the electric power storage unit in a case where a temperature of the drive motor becomes at least a first temperature threshold value.

2. The vehicular heat exchange device according to claim 1,
   wherein the vehicular heat exchange device is configured such that the first valve portion causes the first medium flow circuit and the second medium flow circuit to be in the communication state to raise the temperature of the internal combustion engine before the driving of the internal combustion engine using the heat of the electric power storage unit in a case where a temperature of the electric power storage unit becomes at least a second temperature threshold value.

3. The vehicular heat exchange device according to claim 2, further comprising:
   an electric power storage unit cooling unit provided on a path of the second medium flow circuit and cooling the heat exchange medium flowing through the second medium flow circuit,
   wherein the vehicular heat exchange device is configured such that the first valve portion causes the first medium flow circuit and the second medium flow circuit to be switched from the communication state to the non-communication state to cool the electric power storage unit by the heat exchange medium being cooled in the electric power storage unit cooling unit of the second medium flow circuit in a case where the temperature of the electric power storage unit becomes at least a third temperature threshold value exceeding the second temperature threshold value.

4. The vehicular heat exchange device according to claim 1,
   wherein the electric power storage unit is configured to be chargeable by an external power source, and the first valve portion causes the first medium flow circuit and the second medium flow circuit to be in the communication state in a case where a temperature of the electric power storage unit becomes at least a second temperature threshold value during charging of the electric power storage unit by the external power source.

5. The vehicular heat exchange device according to claim 1, further comprising:
   an electric power storage unit cooling unit provided on a path of the second medium flow circuit and cooling the heat exchange medium flowing through the second medium flow circuit,
   wherein the vehicular heat exchange device is configured such that the electric power storage unit is cooled by the heat exchange medium being cooled in the electric power storage unit cooling unit of the second medium flow circuit while raising the temperature of the internal combustion engine before the driving of the internal combustion engine by the heat of the drive motor switched from the heat of the electric power storage unit in a case where the temperature of the drive motor is the third first temperature threshold value or more.

6. The vehicular heat exchange device according to claim 1,
   wherein an inverter that converts a direct current discharged from the electric power storage unit into an alternating current to be supplied to the drive motor is provided on the path of the third medium flow circuit, and the heat exchange medium flowing through the third medium flow circuit is configured to exchange heat with the drive motor and the inverter.

7. The vehicular heat exchange device according to claim 1, further comprising:
   an internal combustion engine cooling unit provided on the path of the first medium flow circuit and cooling the heat exchange medium flowing through the first medium flow circuit;
   an electric power storage unit cooling unit provided on a path of the second medium flow circuit and cooling the heat exchange medium flowing through the second medium flow circuit; and
   a motor cooling unit provided on the path of the third medium flow circuit and cooling the heat exchange medium flowing through the third medium flow circuit,
   wherein, after the internal combustion engine is started to be driven, the first valve portion causes the first medium flow circuit and the second medium flow circuit to be the non-communication state and the second valve portion causes the first medium flow circuit and the third medium flow circuit to be the non-communication state to cool the internal combustion engine, the electric power storage unit, and the drive motor individually by the internal combustion engine cooling unit, the electric power storage unit cooling unit, and the motor cooling unit, respectively.

8. The vehicular heat exchange device according to claim 4,
   wherein the second temperature threshold value is set such that a difference between the second temperature threshold value and an outside air temperature is a predetermined value.

* * * * *